(12) United States Patent
Da Deppo et al.

(10) Patent No.: US 10,099,629 B2
(45) Date of Patent: Oct. 16, 2018

(54) DEPLOYABLE SENSOR ASSEMBLY

(71) Applicant: Huf North America Automotive Parts Manufacturing Corp., Milwaukee, WI (US)

(72) Inventors: Lynn Da Deppo, Bloomfield Hills, MI (US); Jeffery T. Root, Howell, MI (US); David Newkirk, West Bloomfield, MI (US); Ehab Kamal, Novi, MI (US); Doug Carson, Commerce, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 107 days.

(21) Appl. No.: 15/257,365

(22) Filed: Sep. 6, 2016

(65) Prior Publication Data

US 2018/0066467 A1    Mar. 8, 2018

(51) Int. Cl.
*B60R 11/04* (2006.01)
*B60R 11/00* (2006.01)

(52) U.S. Cl.
CPC ......... *B60R 11/04* (2013.01); *B60R 2011/004* (2013.01); *B60R 2011/0094* (2013.01)

(58) Field of Classification Search
CPC .............. B60R 11/04; B60R 2011/004; B60R 2011/0094; H04N 5/2252; H04N 5/2253; E05B 2009/585; E05B 9/581; E05B 3/5072; E05B 65/1033; E06B 2009/585; E06B 9/581; E06B 3/5072
See application file for complete search history.

(56) References Cited

U.S. PATENT DOCUMENTS

| | | | | |
|---|---|---|---|---|
| 6,497,445 B1* | 12/2002 | Combs, II | ............. | B60J 7/1621 296/100.06 |
| 7,719,408 B2* | 5/2010 | DeWard | .................. | B60R 11/04 340/425.5 |
| 8,821,043 B2* | 9/2014 | Schutz | .................... | B60R 11/04 396/419 |
| 8,836,789 B2* | 9/2014 | Liepold | .................. | B60R 11/04 348/148 |
| 9,264,588 B2* | 2/2016 | Barthel | .................... | B60R 11/04 |
| 9,584,706 B2* | 2/2017 | Scudder | .................. | B60R 11/04 |

(Continued)

*Primary Examiner* — Justin B Rephann
(74) *Attorney, Agent, or Firm* — Honigman Miller Schwartz and Cohn LLP; Matthew H. Szalach; Jonathan P. O'Brien

(57) ABSTRACT

A closure assembly for a deployable sensor assembly is provided. The closure assembly includes a housing; a sensor disposed within the housing; a door supported by the housing; an actuation member operable between a first position and a second position; and an attachment mechanism. The door is movable between a closed position and an open position. The sensor is exposed when the door is in the open position. The actuation member moves the door from the closed position to the open position when moved from the first position to the second position and moves the door from the open position to the closed position when moved from the second position to the first position. The attachment mechanism is operable in a first state to couple the door for movement with the actuation mechanism and in a second state to decouple the door from the actuation mechanism.

25 Claims, 22 Drawing Sheets

(56) References Cited

U.S. PATENT DOCUMENTS

| | | | | |
|---|---|---|---|---|
| 9,718,414 B2* | 8/2017 | Da Deppo | | B60R 11/04 |
| 9,725,049 B2* | 8/2017 | Buschmann | | B60R 11/04 |
| 9,744,914 B2* | 8/2017 | Barthel | | B60R 11/04 |
| 9,751,471 B2* | 9/2017 | Schutz | | B60R 11/04 |
| 9,762,777 B2* | 9/2017 | Dadeppo | | H04N 5/2252 |
| 9,873,387 B2* | 1/2018 | Da Deppo | | B60R 11/04 |
| 2003/0098908 A1* | 5/2003 | Misaiji | | B60R 1/00 |
| | | | | 348/148 |
| 2004/0130622 A1* | 7/2004 | Lang | | B60R 11/04 |
| | | | | 348/148 |
| 2006/0191206 A1* | 8/2006 | Mooney | | B60J 5/0416 |
| | | | | 49/502 |
| 2009/0231430 A1* | 9/2009 | Buschmann | | B60Q 1/0023 |
| | | | | 348/148 |
| 2009/0309971 A1* | 12/2009 | Schuetz | | B60R 11/04 |
| | | | | 348/148 |
| 2010/0026029 A1* | 2/2010 | Easling | | B60D 1/64 |
| | | | | 296/37.6 |
| 2010/0040361 A1* | 2/2010 | Schuetz | | B60R 11/04 |
| | | | | 396/428 |
| 2011/0175376 A1* | 7/2011 | Whitens | | B60R 7/06 |
| | | | | 292/251.5 |
| 2011/0249120 A1* | 10/2011 | Bingle | | B60R 11/04 |
| | | | | 348/148 |
| 2012/0007984 A1* | 1/2012 | Schutz | | B60R 11/04 |
| | | | | 348/148 |
| 2012/0257057 A1* | 10/2012 | Barthel | | B60R 11/04 |
| | | | | 348/148 |
| 2012/0315027 A1* | 12/2012 | Schutz | | B60R 11/04 |
| | | | | 396/419 |
| 2013/0016219 A1* | 1/2013 | Hahner | | B60R 11/04 |
| | | | | 348/148 |
| 2013/0062497 A1* | 3/2013 | Van Huis | | B60R 11/04 |
| | | | | 248/479 |
| 2013/0076059 A1* | 3/2013 | Zalan | | E05B 83/34 |
| | | | | 296/97.22 |
| 2013/0155238 A1* | 6/2013 | Scudder | | B60R 11/04 |
| | | | | 348/148 |
| 2013/0209079 A1* | 8/2013 | Alexander | | B60R 11/04 |
| | | | | 396/25 |
| 2013/0235204 A1* | 9/2013 | Buschmann | | B60R 11/04 |
| | | | | 348/148 |
| 2013/0335624 A1* | 12/2013 | Barthel | | B60R 11/04 |
| | | | | 348/373 |
| 2014/0043528 A1* | 2/2014 | Barthel | | B60R 11/04 |
| | | | | 348/373 |
| 2014/0085467 A1* | 3/2014 | Barthel | | B60R 11/04 |
| | | | | 348/148 |
| 2014/0158731 A1* | 6/2014 | Squire | | B60R 11/04 |
| | | | | 224/545 |
| 2014/0320654 A1* | 10/2014 | Dadeppo | | G02B 27/0006 |
| | | | | 348/148 |
| 2015/0030319 A1* | 1/2015 | Matori | | G03B 17/561 |
| | | | | 396/419 |
| 2015/0048644 A1* | 2/2015 | Georgi | | B60K 15/05 |
| | | | | 296/97.22 |
| 2015/0183302 A1* | 7/2015 | Da Deppo | | B60R 11/04 |
| | | | | 49/324 |
| 2015/0183366 A1* | 7/2015 | Da Deppo | | B60R 11/04 |
| | | | | 701/2 |
| 2015/0258944 A1* | 9/2015 | Buschmann | | B60R 11/04 |
| | | | | 348/373 |
| 2015/0258945 A1* | 9/2015 | Schutz | | B60R 11/04 |
| | | | | 348/373 |
| 2016/0144798 A1* | 5/2016 | Yoshikuni | | B60R 11/04 |
| | | | | 348/148 |
| 2016/0311375 A1* | 10/2016 | Biemer | | H01R 33/00 |
| 2016/0316114 A1* | 10/2016 | Buss | | B60R 11/04 |
| 2017/0050581 A1* | 2/2017 | Buss | | B60R 11/04 |
| 2017/0123294 A1* | 5/2017 | Ashtiani | | B60R 11/04 |
| 2017/0335618 A1* | 11/2017 | Da Deppo | | E05F 15/619 |
| 2017/0361780 A1* | 12/2017 | Edgarian | | B60R 11/04 |

* cited by examiner

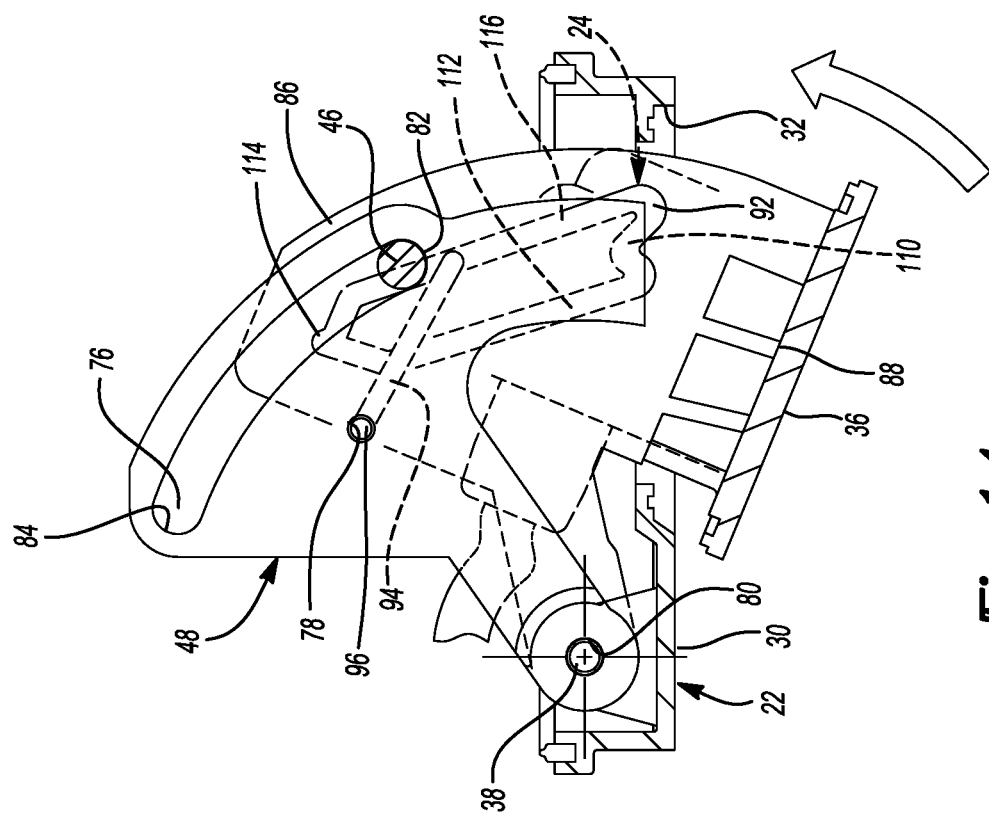
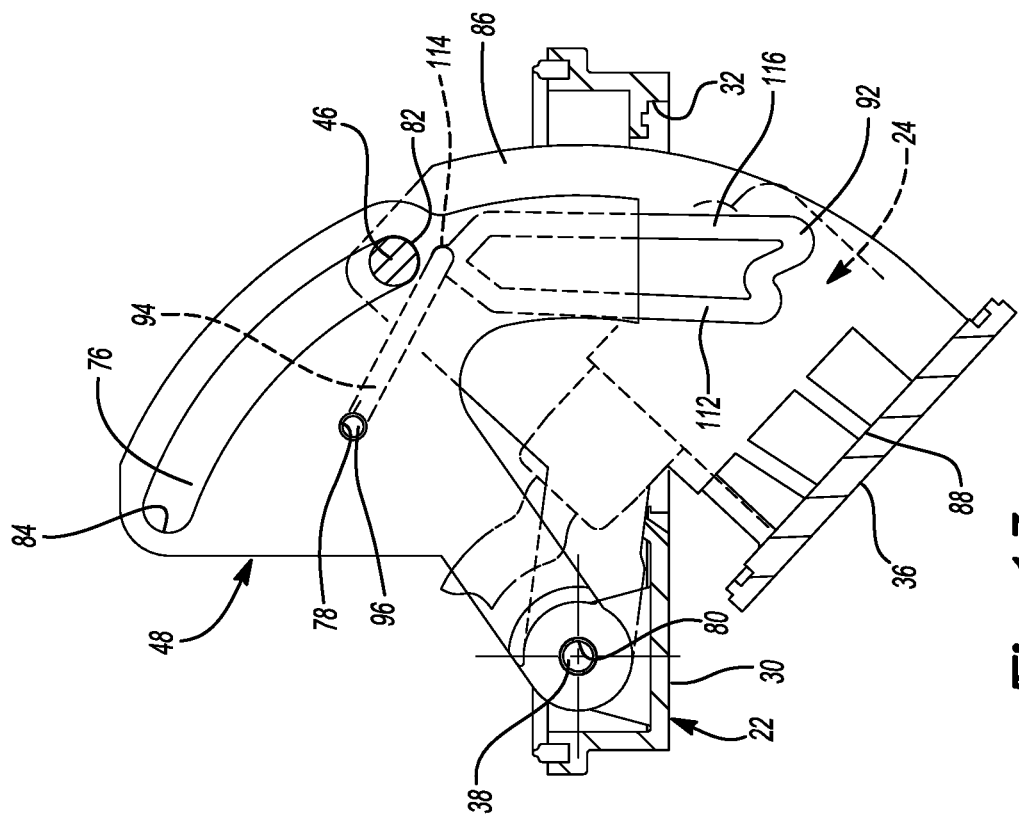

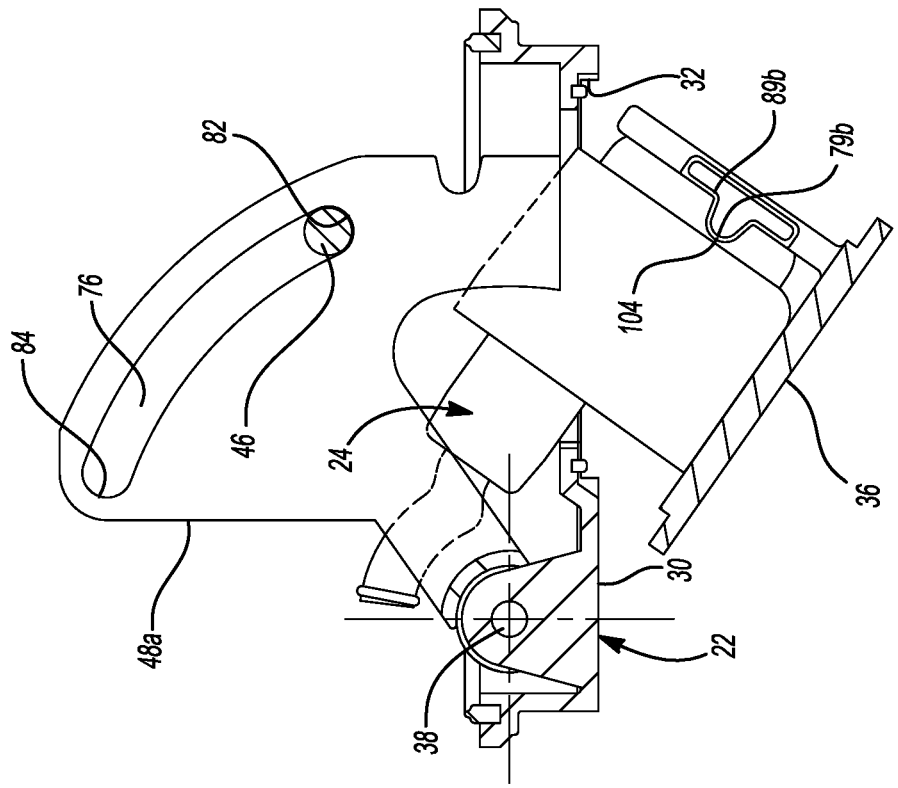
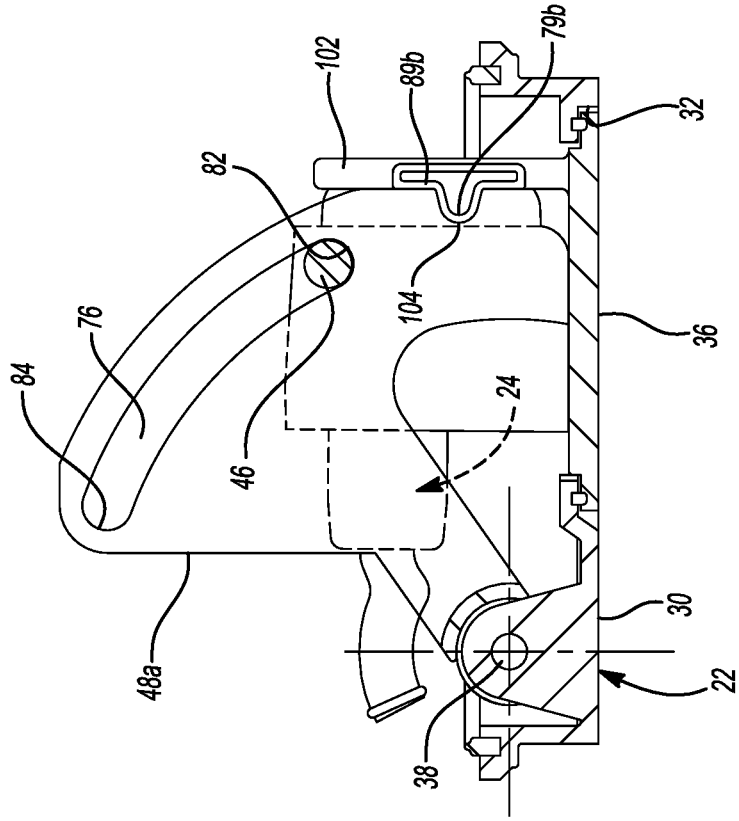
Fig-24
Fig-23

DEPLOYABLE SENSOR ASSEMBLY

FIELD

The present disclosure relates generally to a sensor assembly for a vehicle and more particularly to a manually deployable sensor assembly for a vehicle.

BACKGROUND

This section provides background information related to the present disclosure which is not necessarily prior art.

Many motor vehicles now come equipped with some variation of a camera and sensor system to provide real-time monitoring or viewing of an area near the motor vehicle. For example, cameras, sensors, or both are often positioned on the front of the vehicle or on the rear of the motor vehicle. The cameras and sensors can detect the areas surrounding the vehicle that may or may not be otherwise viewable with the conventional mirrors. Such cameras and sensors can be used to assist the vehicle operator in parking or maneuvering the vehicle during normal operation, for example.

To provide a consistent field of view, many camera and sensor systems do not include a cover and are fixedly directed at the space they are intended to monitor. Uncovered cameras and sensors are prone to damage from environmental conditions and exposure, including damage from dirt and stone chipping, and also from human intervention, including theft.

To better protect the camera, sensor, or other device, a deployable system may be utilized. In a deployable system, the sensor, camera, or other suitable device, may utilize an electric motor to drive the system between an open or "deployed" position and a closed or "stowed" position. The motor may be linked to a set of gears to provide a speed and torque realignment and a set of links and/or cams to provide the motion to activate the desired deployment and stowing of the camera or sensor. The system may be activated by various actions of a vehicle user. For example, to deploy the system, the vehicle user may place a gear selector into a reverse position, which may activate the electric motor in a first direction. To stow the system, the vehicle user may place the gear selector into a park, neutral, or drive position, which may activate the electric motor in a second direction opposite the first direction.

While conventional deployable systems adequately move a camera or sensor between a stowed position and a deployed position, such systems do not provide for manual operation of the system. As such, maintaining the sensor or camera is difficult, as such sensors and cameras are typically only in the deployed position when a vehicle in which the sensor or camera is installed is being operated (i.e., when the vehicle is operated in reverse). As such, a user of the vehicle cannot easily repair, clean, or otherwise access the camera or sensor of a conventional deployable system for maintenance or otherwise.

SUMMARY

This section provides a general summary of the disclosure, and is not a comprehensive disclosure of its full scope or all of its features.

One aspect of the disclosure provides a closure assembly for a deployable sensor assembly. The closure assembly includes: a housing; a sensor disposed within the housing; a door supported by the housing; an actuation member operable between a first position and a second position; and an attachment mechanism. The door is movable between a closed position and an open position. The sensor is exposed when the door is in the open position. The actuation member moves the door from the closed position to the open position when moved from the first position to the second position and moves the door from the open position to the closed position when moved from the second position to the first position. The attachment mechanism is operable in a first state to couple the door for movement with the actuation mechanism and in a second state to decouple the door from the actuation mechanism.

Implementations of the disclosure may include one or more of the following optional features. In some implementations, the attachment mechanism includes an energy retaining connection. The energy retaining connection may be a deformable member. The energy retaining connection may also include an energy storing element. The energy storing element may include at least one of a leaf spring and a coil spring.

In some examples, the attachment mechanism includes a magnet. The magnet may have a first portion associated with the actuation member and a second portion associated with the door. The actuation member may be movable from the first state to the second state by applying a manual force on the door. The attachment mechanism may be automatically returned to the first state from the second state when the actuation mechanism is cycled from the first position to the second position.

Another aspect of the disclosure provides a closure assembly for a deployable sensor assembly. The closure assembly includes: a housing; a sensor disposed within the housing; a door supported by the housing; and an actuation member operable between a first position and a second position. The actuation member moves the door from the closed position to the open position when moved from the first position to the second position and moves the door from the open position to the closed position when moved from the second position to the first position. The actuation member is operable to be decoupled from the door when a manual force at or above a predetermined magnitude is applied to the door.

This aspect may include one or more of the following optional features. In some implementations, the door is movable from the closed position to the open position when the door is decoupled from the actuation mechanism regardless of the position of the actuation mechanism. The closure assembly may also include an attachment mechanism operable in a first state to couple the door for movement with the actuation mechanism and in a second state to decouple the door from the actuation mechanism.

In some examples, the attachment mechanism may include an energy retaining connection. The energy retaining connection may be a deformable member. The energy retaining connection may also include an energy storing element. The energy storing element may include at least one of a leaf spring and a coil spring.

In some implementations, the attachment mechanism includes a magnet. The magnet may have a first portion associated with the actuation member and a second portion associated with the door. The actuation mechanism may be movable from the first state to the second state by applying the manual force on the door. In some examples, the attachment mechanism is automatically returned to the first state from the second state when the actuation mechanism is cycled from the first position to the second position.

Yet another aspect of the disclosure provides a method of operating a closure assembly. The method includes moving a door between a closed position and an open position relative to a housing via an actuation member. The actuation member moves the door from the closed position to the open position when moved from a first position to a second position and moves the door from the open position to the closed position when moved from the second position to the first position. The method also includes exposing a sensor disposed within the housing when the door is in the open position and applying a manual force at or above a predetermined magnitude to the door to decouple the door from the actuation mechanism.

This aspect may include one or more of the following optional features. In some implementations, the method includes permitting the door to be movable from the closed position to the open position regardless of the position of the actuation mechanism when the door is decoupled from the actuation mechanism. The method may also include coupling the door to the actuation mechanism via an attachment mechanism to cause the door to move with the actuation mechanism between the first position and the second position. Applying the manual force at or above a predetermined magnitude may include decoupling the attachment mechanism from the actuation mechanism. Coupling the door to the actuation mechanism via an attachment mechanism may include coupling the door via at least one of a leaf spring, a coil spring, and a magnet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 13 is a partial cross-sectional view of the deployable sensor assembly of FIG. 3 shown in the manually deployed position;

FIG. 14 is a partial cross-sectional view of the deployable sensor assembly of FIG. 3 shown moving from the manually deployed position toward the stowed position;

FIG. 23 is a partial cross-sectional view of an alternate attachment mechanism for use with the deployable sensor assembly of FIG. 3 or FIG. 15 shown in a stowed position;

FIG. 24 is a partial cross-sectional view of the attachment mechanism of FIG. 23 shown in a manually deployed position;

Corresponding reference numerals indicate corresponding parts throughout the drawings.

DETAILED DESCRIPTION

Figure 1:
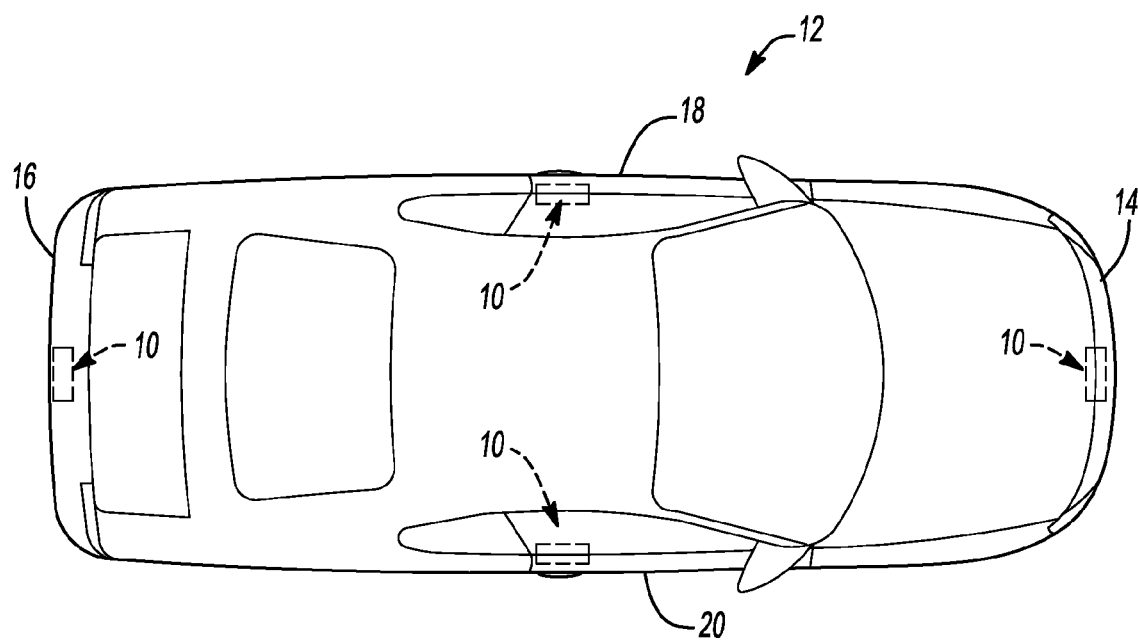
FIG. 1 is a top view of a vehicle.
Figure 2:
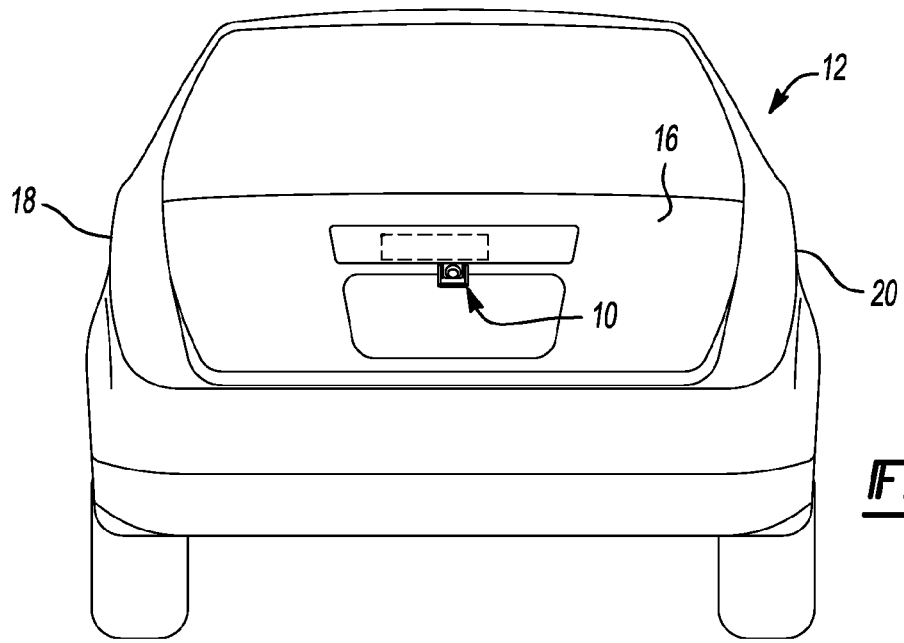
FIG. 2 is a rear view of the vehicle of FIG. 1.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 5:
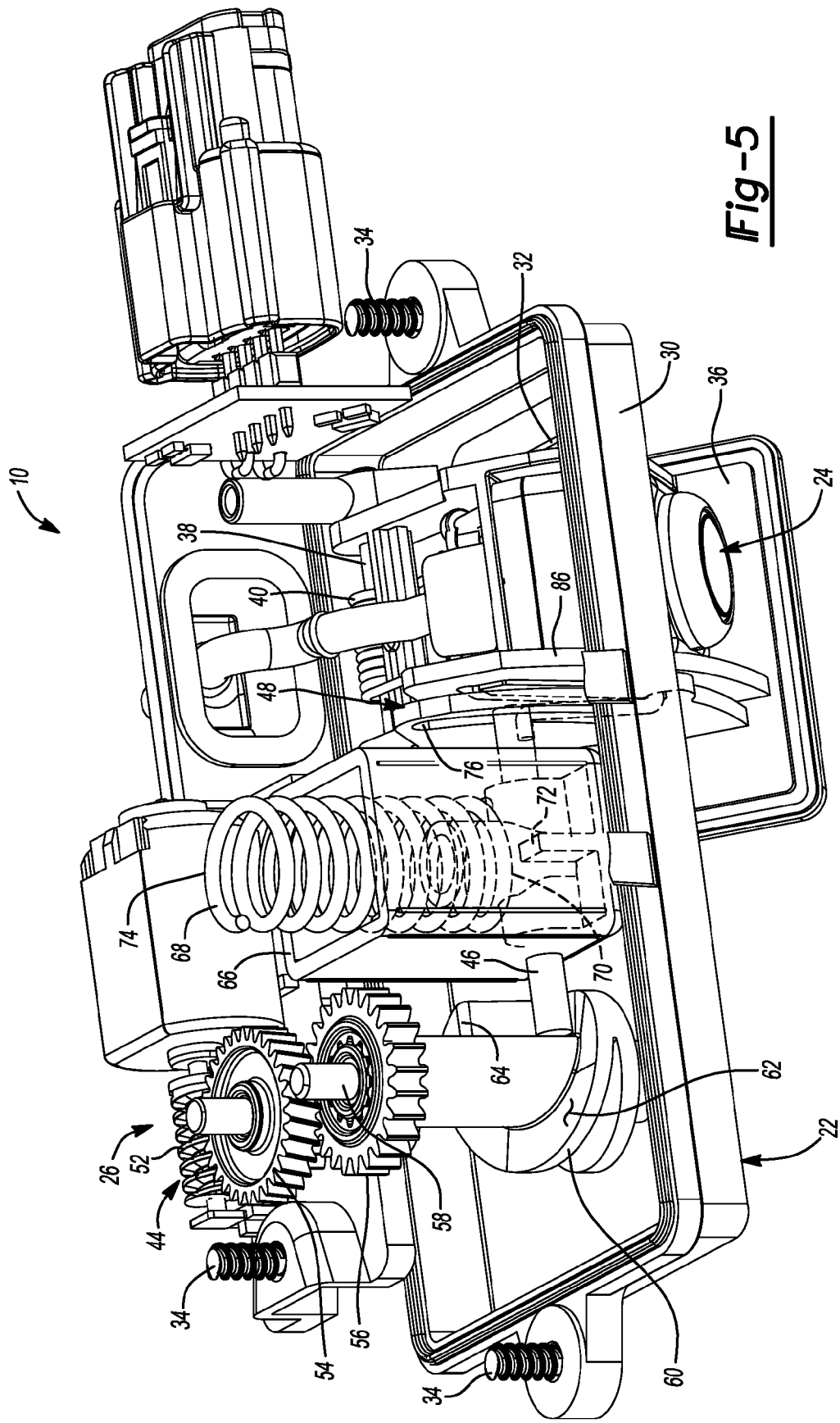
FIG. 5 is a perspective view of the deployable sensor assembly of FIG. 3 shown in a deployed position.
Figure 6:
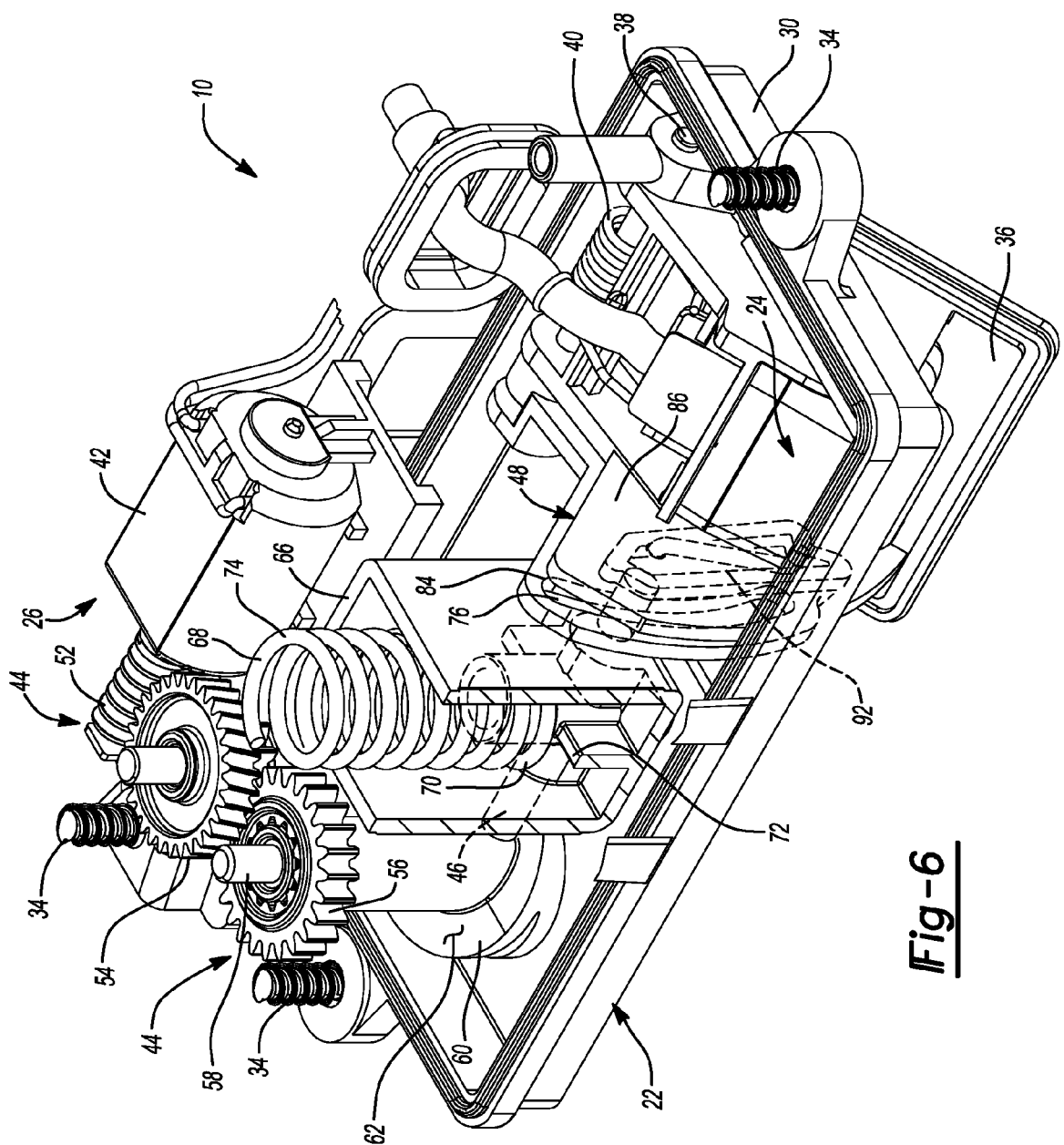
FIG. 6 is a perspective view of the deployable sensor assembly of FIG. 3 shown in a deployed position.
Figure 7:
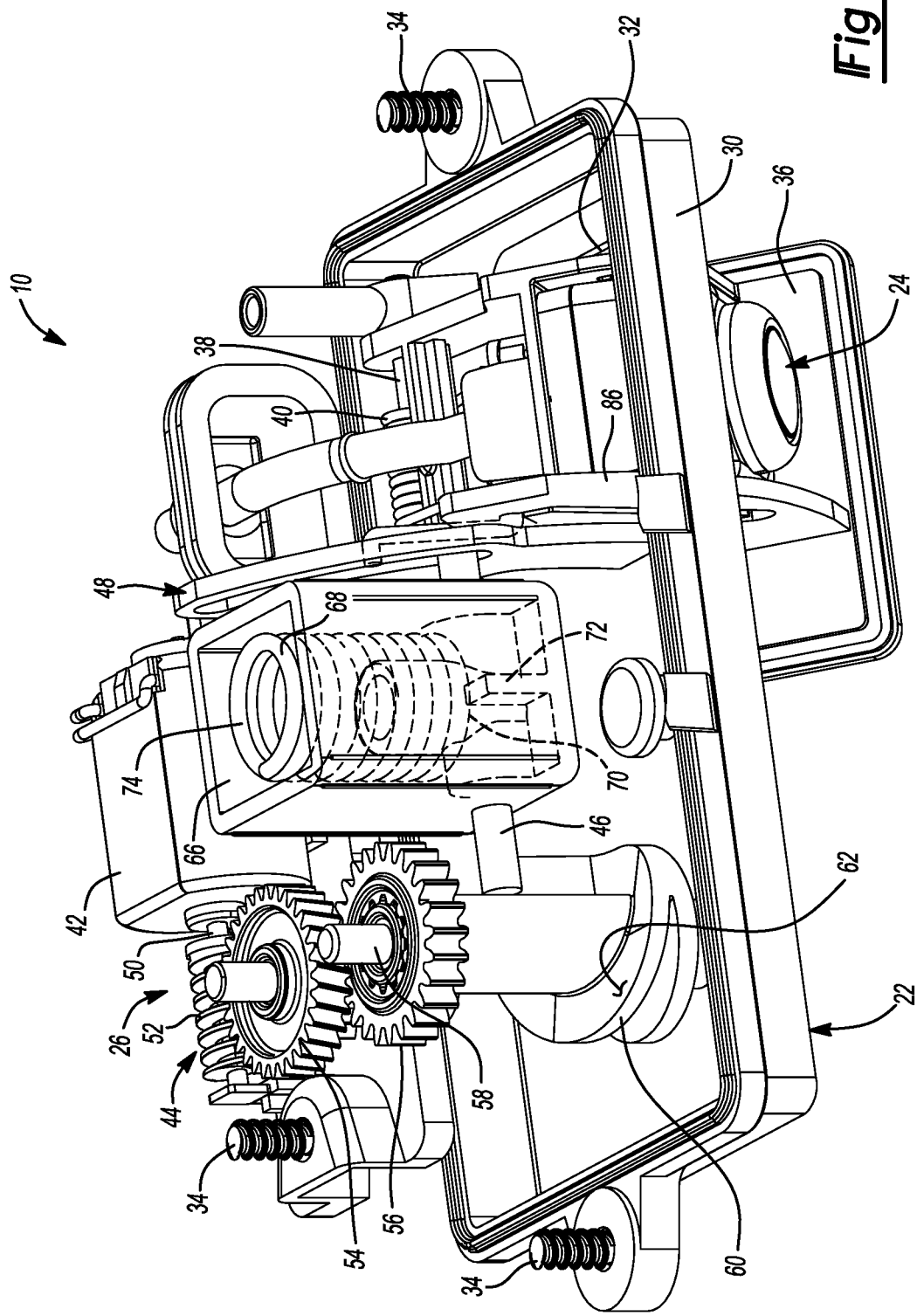
FIG. 7 is a perspective view of the deployable sensor assembly of FIG. 3 shown in a manually deployed position.
Figure 8:
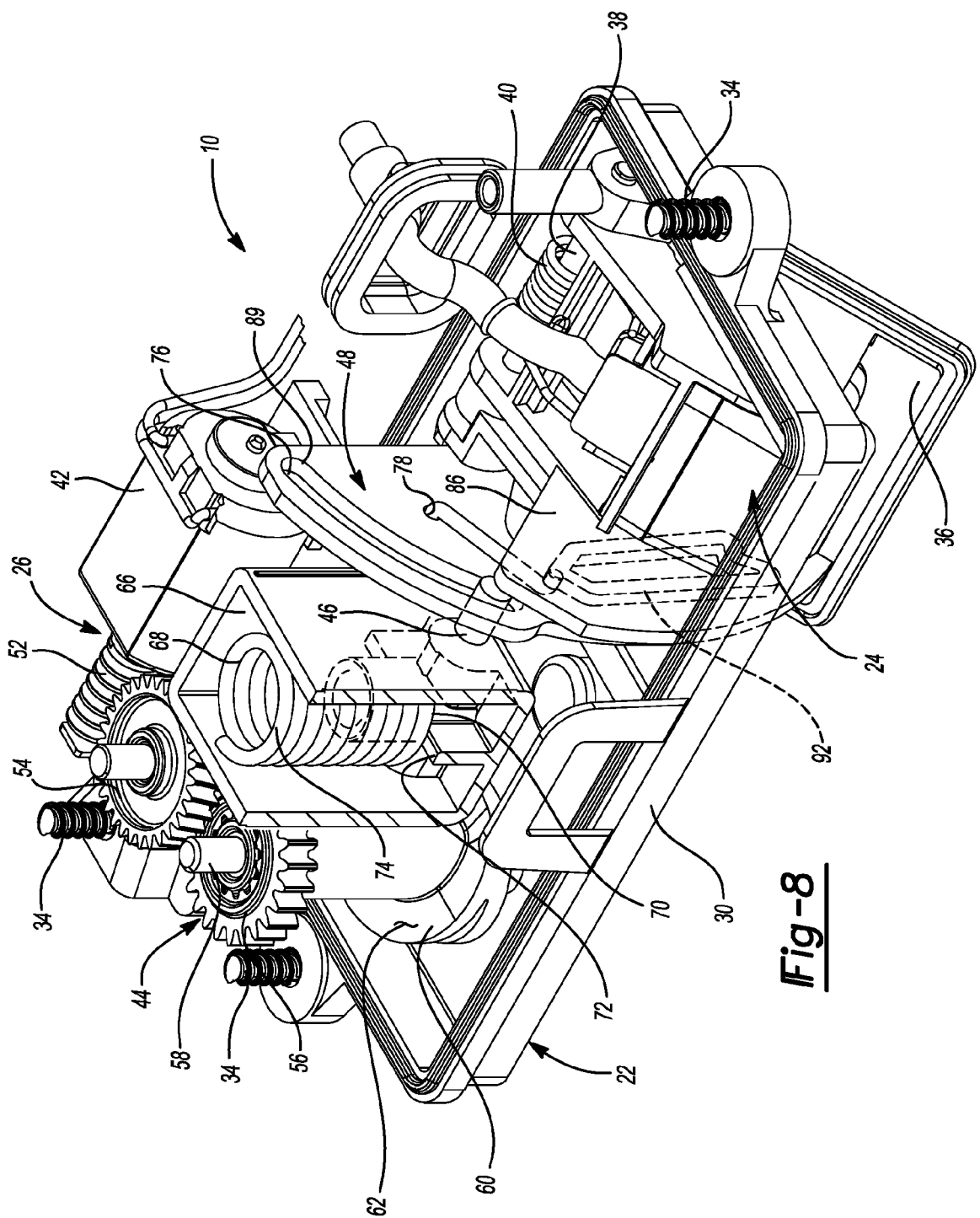
FIG. 8 is a perspective view of the deployable sensor assembly of FIG. 3 shown in a manually deployed position.

With reference to the figures, a deployable sensor assembly 10 for use in conjunction with a vehicle 12 is provided. The vehicle 12 may include a front portion 14, a rear portion 16, a first side portion 18, a second side portion 20, and one or more deployable sensor assemblies 10. In some configurations, the vehicle 12 may include four deployable sensor assemblies 10. For example, the vehicle 12 may include a first deployable sensor assembly 10 disposed on the front portion 14 (e.g., disposed proximate a front bumper), a second deployable sensor assembly 10 disposed on the rear portion 16 (e.g., disposed proximate a rear bumper), a third deployable sensor assembly 10 disposed on the first side portion 18 (e.g., disposed proximate a driver's side door), and a fourth deployable sensor assembly 10 disposed on the second side portion 20 (e.g., disposed proximate a passenger's side door). As will be explained in more detail below, the position of each deployable sensor assembly 10 may be selectively controllable relative to the vehicle 12. In particular, the deployable sensor assemblies 10 may be movable (e.g., rotatable, pivotable, translatable, etc.) between a stowed or closed position (FIG. 3) and a deployed or open position (FIG. 5). In the open position, the deployable sensor assembly 10 can communicate with an end user (e.g., a driver of the vehicle 12) via audio and/or visual signals (e.g., via an infotainment display) in order to notify the end user of various environmental conditions in an area surrounding the vehicle 12.

With reference to FIGS. 3-14, the deployable sensor assembly 10 is provided and may include a housing 22, a sensor 24, an actuation mechanism 26, and an attachment mechanism 28. The sensor 24 is disposed within the housing 22 in the stowed position (FIG. 3) and extends from the housing 22 in the deployed position (FIG. 5). As will be described below, the sensor 24 may be moved from the stowed position to the deployed position via the actuation mechanism 26 or, alternatively, independent of the actuation mechanism 26 by manually releasing the attachment mechanism 28. While element 24 will hereinafter be referred to as a "sensor," element 24 could be any type of sensor such as, for example, a camera or a motion sensor.

Figure 9:
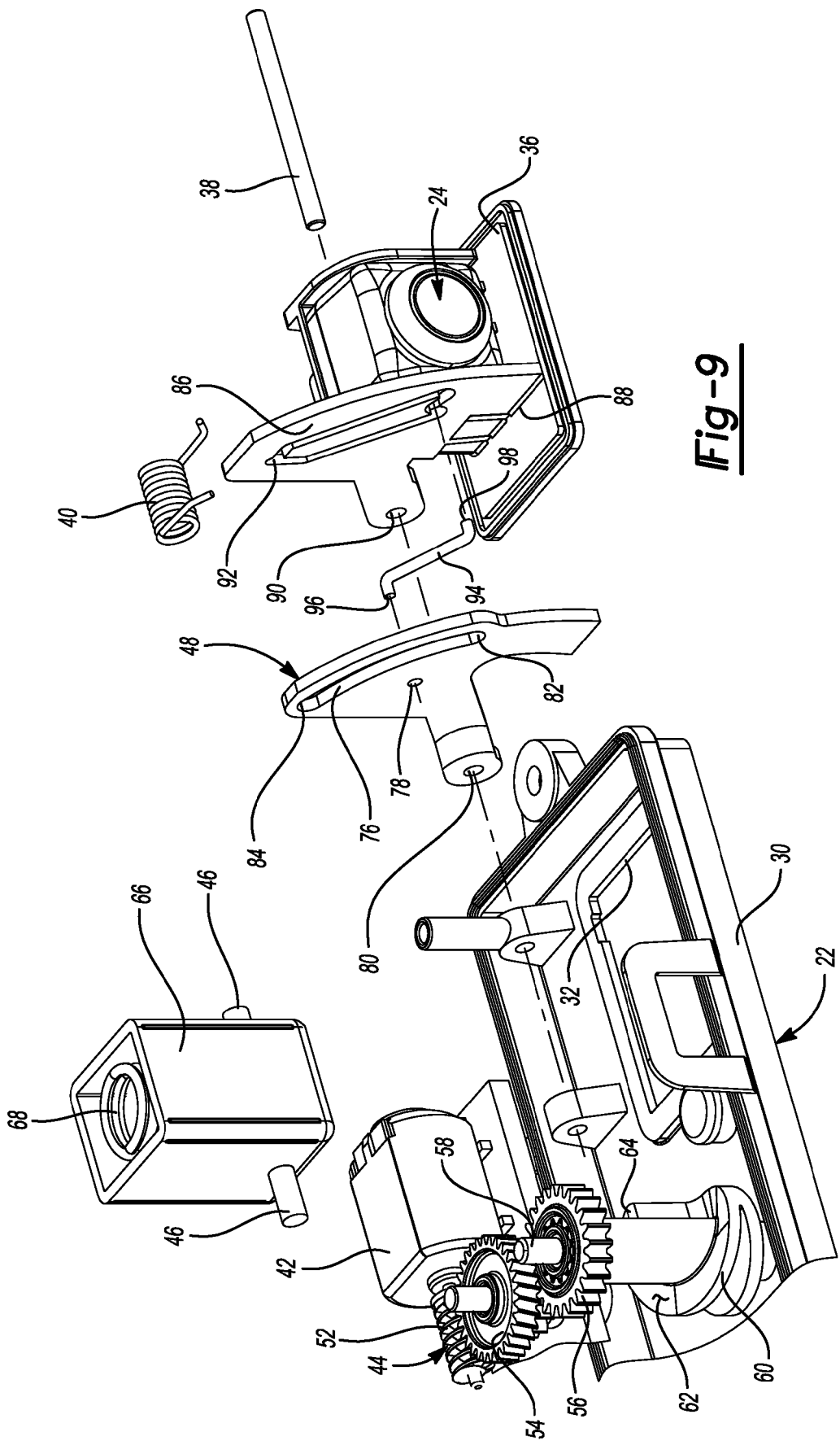
FIG. 9 is a partial exploded view of the deployable sensor assembly of FIG. 3.

The housing 22 may be attached to the vehicle 12 and may include a body 30 defining an opening 32 (FIG. 9). The housing 22 may additionally include one or more fasteners 34 that attach the housing 22 and, thus, the sensor 24, actuation mechanism 26, and attachment mechanism 28, to the vehicle 12. The housing 22 may additionally include a door 36 that is fixed for movement with the sensor 24 and closes the opening 32 of the housing 22 when the sensor 24 is in the stowed position. As such, the door 36 effectively blocks the sensor 24 from view in this position.

The sensor 24 is rotatably supported by the body 30 of the housing 22 between the stowed position and the deployed position. Namely, the sensor 24 is rotatably supported by an axle 38 (FIG. 6) relative to the housing 22 and is biased into the deployed position by a biasing element 40. In one configuration, the biasing element 40 is a coil spring acting on the housing 22 and the sensor 24 to bias the sensor 24 into the deployed position (i.e., in the clockwise (CW) direction relative to the view shown in FIGS. 11-14).

The actuation mechanism 26 includes a motor 42, a gear train 44, an actuation pin 46, and an actuation member 48. In one configuration, the motor 42 is an electric motor that drives the gear train 44. For example, the motor 42 may drive an output shaft 50 fixed for rotation with a worm gear 52. The worm gear 52 may be meshed with a first drive gear 54 which, in turn, is meshed with a second drive gear 56. Accordingly, when the motor 42 drives the output shaft 50, the worm gear 52, first drive gear 54, and second drive gear 56 are likewise rotated.

The second drive gear 56 may be splined to a shaft 58 having a ramp 60. Accordingly, when the second drive gear 56 is rotated by the first drive gear 54, the shaft 58 and ramp 60 are likewise rotated. The ramp 60 includes a ramp surface 62 having a terminal end 64 (FIGS. 5 and 9). The ramp surface 62 receives the actuation pin 46, thereby causing the actuation pin 46 to move along the ramp 60 when the ramp 60 is rotated relative to the housing 22, as will be described in detail below.

Figure 3:
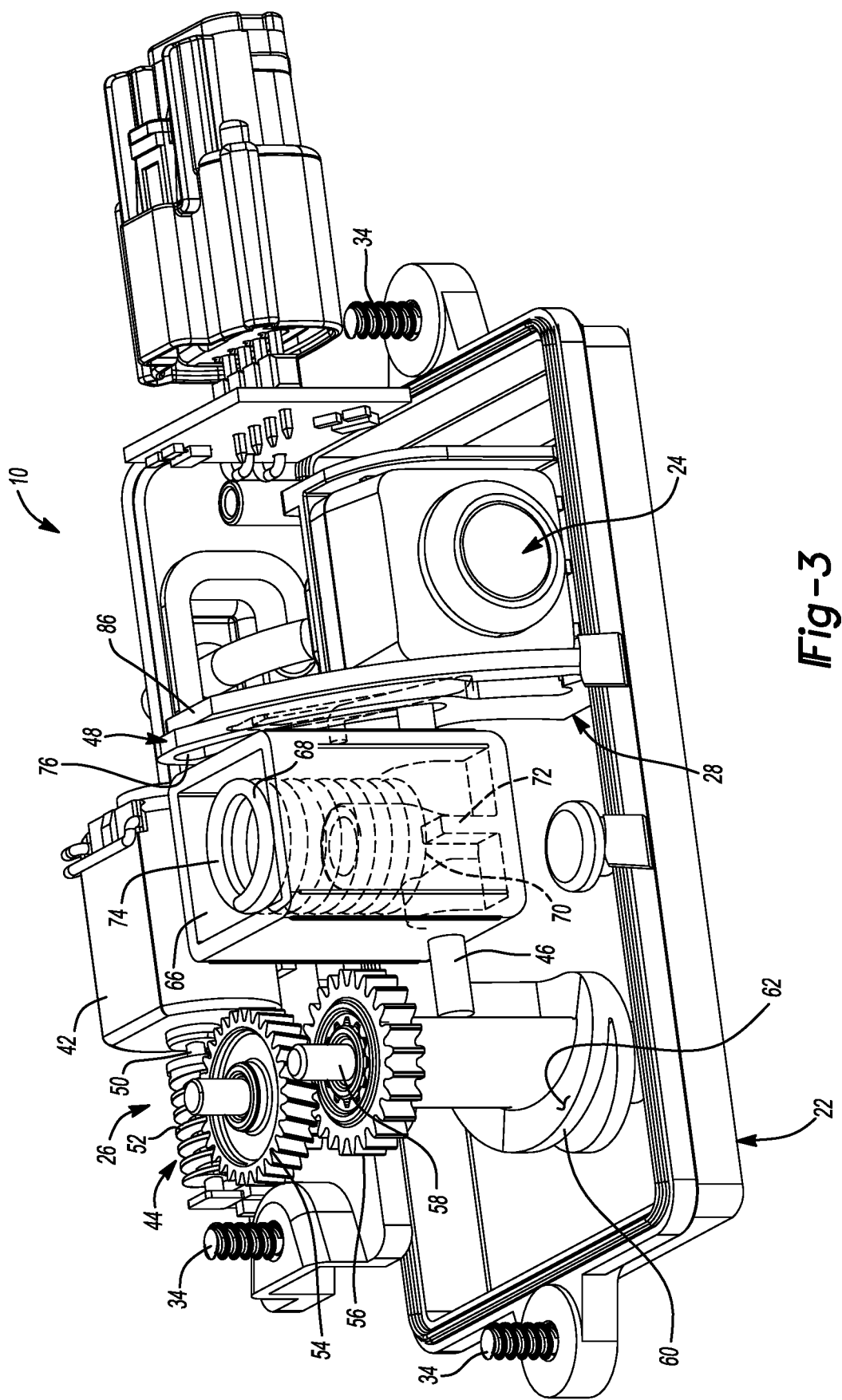
FIG. 3 is perspective view of a deployable sensor assembly for use with the vehicle of FIGS. 1 and 2 and shown in a first position according to the principles of the present disclosure.
Figure 4:
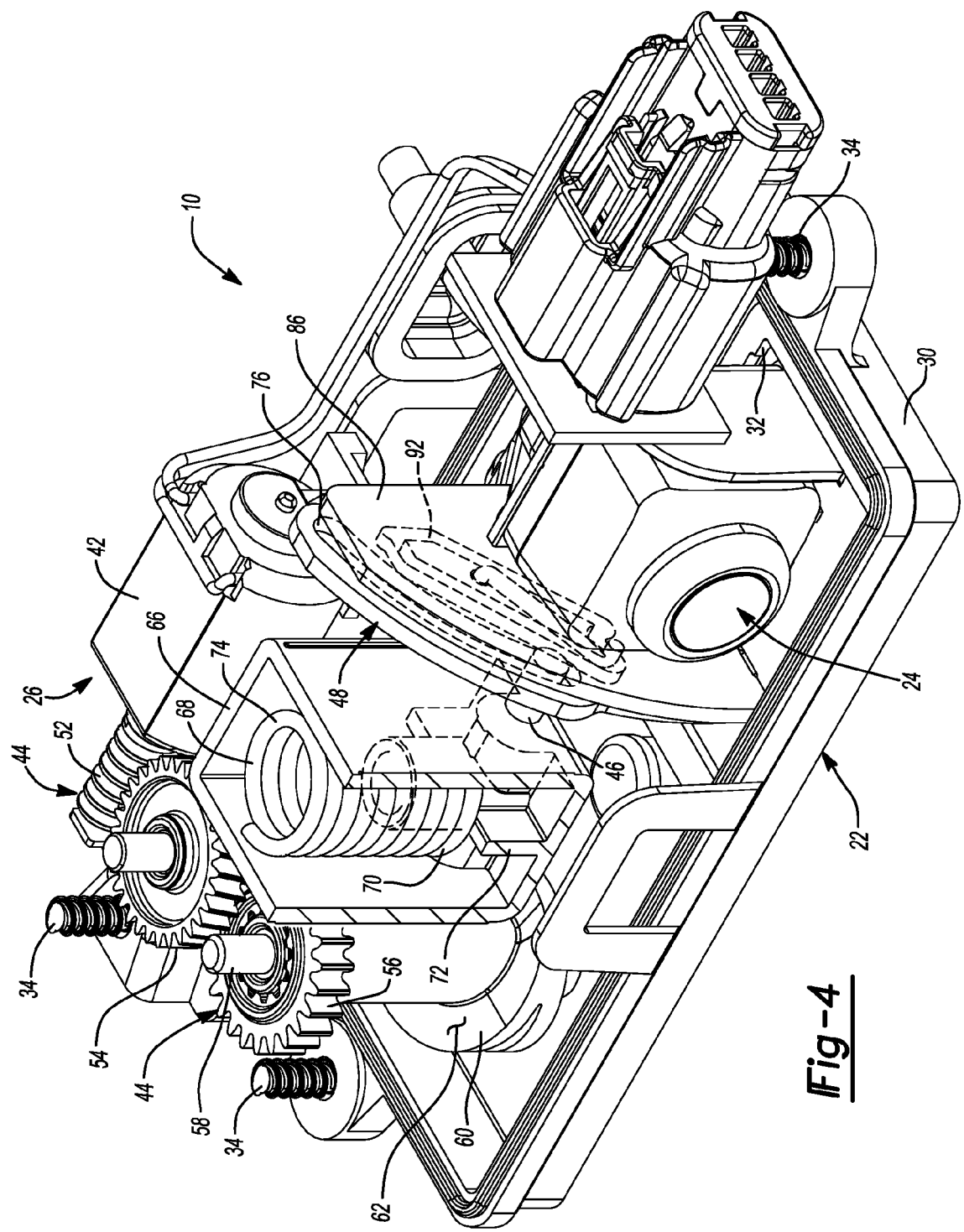
FIG. 4 is a perspective view of the deployable sensor assembly of FIG. 3 shown in a stowed position.

The actuation pin 46 is attached to a housing 66 and is biased toward the housing 22 by a biasing element 68. As shown in FIG. 3, the biasing element 68 may be a coil spring and may be disposed at least partially within the housing 66. For example, the biasing element 68 may extend between a first end 70 in contact with a flange 72 disposed within and attached to the housing 66 (FIG. 4) and a second end 74 fixed relative to the first end 70.

Figure 10:
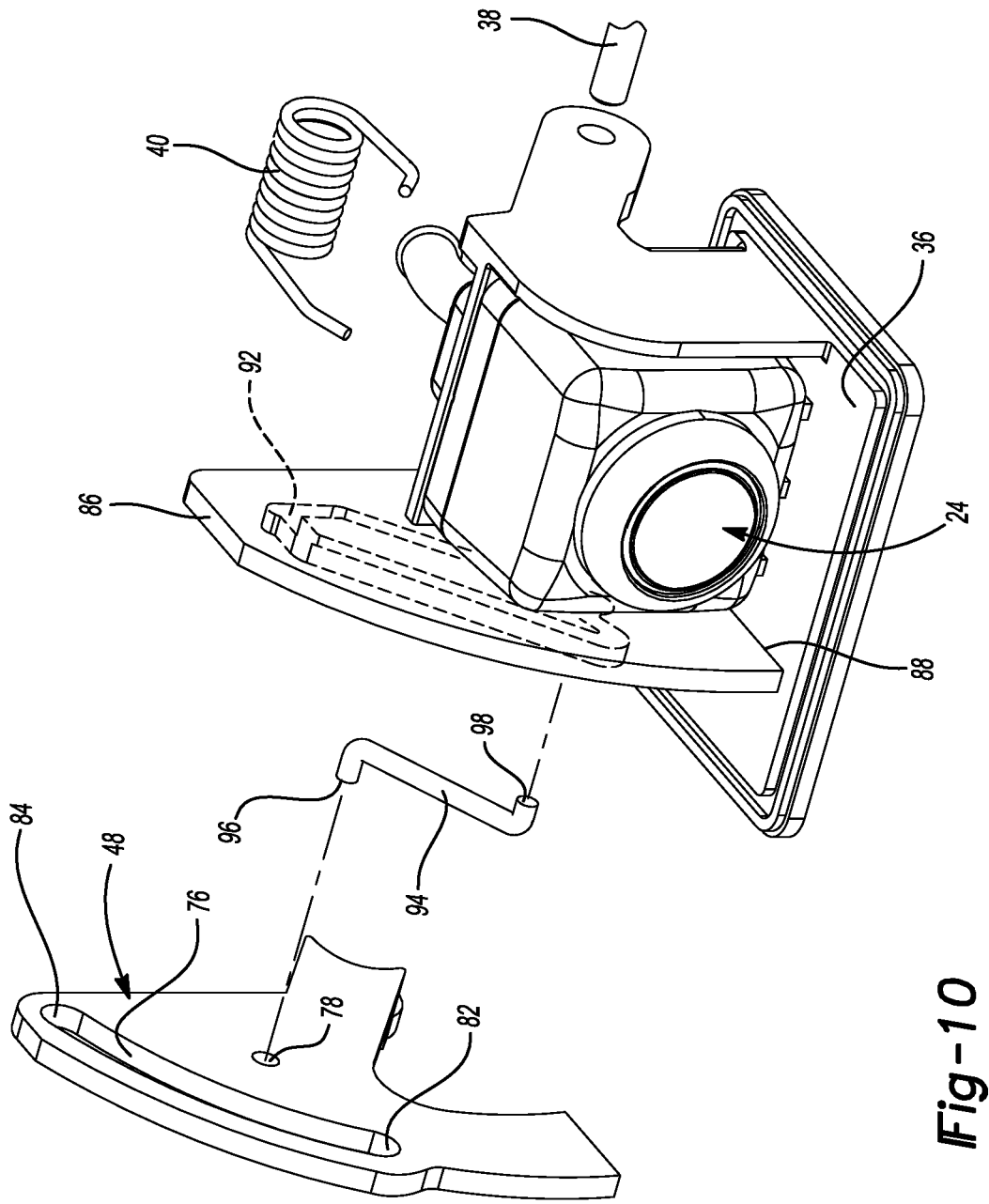
FIG. 10 is a partial exploded view of the deployable sensor assembly of FIG. 3.

With particular reference to FIGS. 9-14, the actuation member 48 may include a cam slot 76, a pin aperture 78, and an attachment aperture 80. The cam slot 76 slidably receives the actuation pin 46 and includes a first end 82 and a second end 84 (FIG. 10). The pin aperture 78 is generally disposed between the cam slot 76 and the attachment aperture 80 and receives a portion of the attachment mechanism 28 therein, as will be described in detail below. The attachment aperture 80 receives the axle 38 therein to allow the actuation member 48 to be rotatably supported by the axle 38 relative to the housing 22. Accordingly, the attachment aperture 80 rotatably attaches the actuation member 48 to the housing 22 via the axle 38 and, therefore, provides the actuation member 48 and the sensor 24 with a common axis of rotation.

With particular reference to FIGS. 9-14, the attachment mechanism 28 may include a guide plate 86 having a bottom edge 88 attached to the door 36, an attachment aperture 90, and a slot 92. Because the bottom edge 88 is attached to the door 36, the guide plate 86 is fixed for movement with the sensor 24 and the door 36, as will be described in detail below. The attachment aperture 90 rotatably receives the axle 38 therein and, as such, rotatably attaches the guide plate 86 to the housing 22 such that the guide plate 86 has a common axis of rotation with the sensor 24 and the actuation member 48.

The slot 92 is formed into the guide plate 86 and slidably receives a pin 94 of the attachment mechanism 28 therein. As shown in FIG. 9, the slot 92 may be a closed, continuous slot and may act as a cam surface. The pin 94 includes a first end 96 rotatably attached to the actuation member 48 at the pin aperture 78 and a second end 98 slidably received within the slot 92. In operation, the second end 98 of the pin 94 acts as a follower and traverses the slot 92 as the guide plate 86 rotates about the axle 38 relative to the housing 22.

With particular reference to FIGS. 3-14, operation of the deployable sensor assembly 10 will be described in detail. The sensor 24 may be deployed based on input from a user of the vehicle 12. Namely, when a user positions a gear-shift mechanism (not shown) of the vehicle 12 into reverse, a signal may be sent to energize the motor 42. When the motor 42 is energized, the output shaft 50 and, thus, the worm gear 52 are rotated. Rotation of the worm gear 52 likewise causes rotation of the first drive gear 54 and the second drive gear 56 relative to the housing 22.

Rotation of the second drive gear 56 causes rotation of the ramp 60 relative to the housing 22, which causes the actuation pin 46 to move along the cam surface 62 relative to the housing 22. In the stowed position, the actuation pin 46 is disposed proximate to the terminal end 64 of the cam surface 62, as shown in FIG. 3. In this position, the biasing element 68 is compressed and exerts a force on the actuation pin 46 in a direction toward the housing 22. When the motor 42 is energized and the ramp 60 rotates relative to the housing 22, the actuation pin 46 disengages the terminal end 64 of the ramp surface 62 and moves toward the housing 22.

The actuation pin 46 moves toward the housing 22 due to the force exerted on the flange 72 by the biasing element 68. In so doing, the actuation pin 46 exerts a force on the slot 76 at the first end 82, thereby causing the actuation member 48 to rotate relative to the housing 22 and causing the actuation pin 46 to traverse the slot 76 and move from the first end 82 toward the second end 84. Rotation of the actuation member 48 relative to the housing 22 likewise causes rotation of the guide plate 86, the door 36, and the sensor 24 relative to the housing 22 due to interaction between the pin 94 and the slot 92. Namely, the second end 98 of the pin 94—acting as a cam follower—is positioned within a detent 110 of the slot 92 and is held in this position due to the force exerted on the guide plate 86 by the biasing element 40 in the clockwise (CW) direction relative to the view shown in FIG. 11. Maintaining the second end 98 of the pin 94 within the detent 110 fixes the guide plate 86 and, thus, the sensor 24 and the door 36, for movement with the actuation member 48, as the pin 94 is rotatably coupled to the actuation member 48 at the pin aperture 78. As such, when the actuation member 48 is rotated in the clockwise (CW) relative to the view shown in FIG. 12, the guide plate 86, the door 36, and the sensor 24 are moved into the deployed position under the rotational force exerted on the sensor 24 by the biasing element 40. Accordingly, the sensor 24 is moved from the stowed position (FIG. 3) to the deployed position (FIG. 5) and is permitted to sense an area around the vehicle 12 proximate to the opening 32 of the body 30.

The motor 42 may be driven in the same direction to return the sensor 24 to the stowed position by once again driving the gear train 44 relative to the housing 22. Namely, the motor 42 may rotate the ramp 60, thereby causing the actuation pin 46 to move along the ramp surface 62 toward the terminal end 64. In so doing, the actuation pin 46—via the flange 72—compresses the biasing element 68 and causes the actuation pin 46 to traverse the slot 76. Movement of the actuation pin 46 along the slot 76 causes the actuation member 48 to rotate relative to the housing 22. Rotation of the actuation member 48 likewise causes rotation of the guide plate 86, the door 36, and the sensor 24 toward the stowed position, as these elements 24, 36, 86 are fixed for movement with the actuation member 48 when the second end 98 of the pin 94 is disposed within the detent 100. Once the actuation pin 46 is returned to the position shown in FIG. 3—proximate to the terminal end 64 of the ramp 60—power to the motor 42 is stopped and the sensor 24 is returned to the stowed position with the door 36 being substantially flush with the body 30 of the housing 22.

The foregoing describes normal operation of the sensor assembly 10. Should a user wish to access the sensor 24 independent from operation of the vehicle 12 to perform maintenance on or clean the sensor 24, the sensor 24, the door 36, and the guide plate 86 may be manually rotated relative to the housing 22 and into the deployed position independent of the actuation mechanism 26. Namely, the actuation mechanism 26 may remain in the stowed position with the actuation pin 46 disposed adjacent to the first end 82 of the slot 76 of the actuation member 48 and the sensor 24, the door 36, and the guide plate 86 may all be manually moved into the deployed position in an effort to access the sensor 24.

Figure 12:
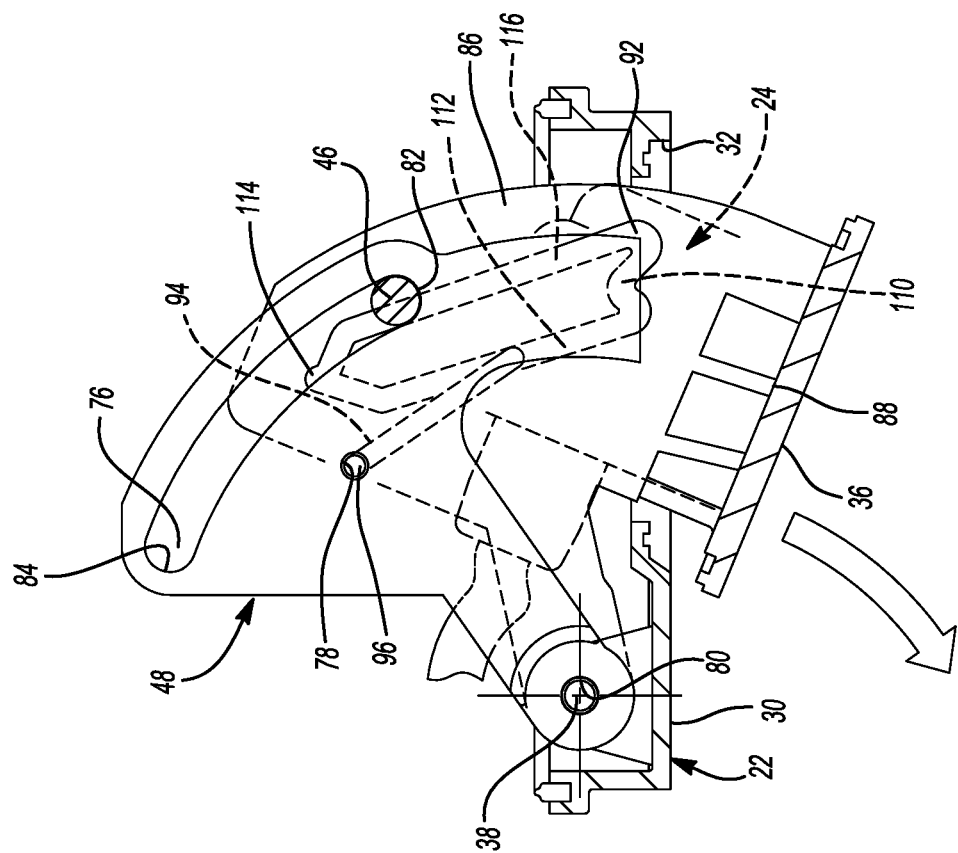
FIG. 12 is a partial cross-sectional view of the deployable sensor assembly of FIG. 3 shown moving from the stowed position toward the manually deployed position.
Figure 11:
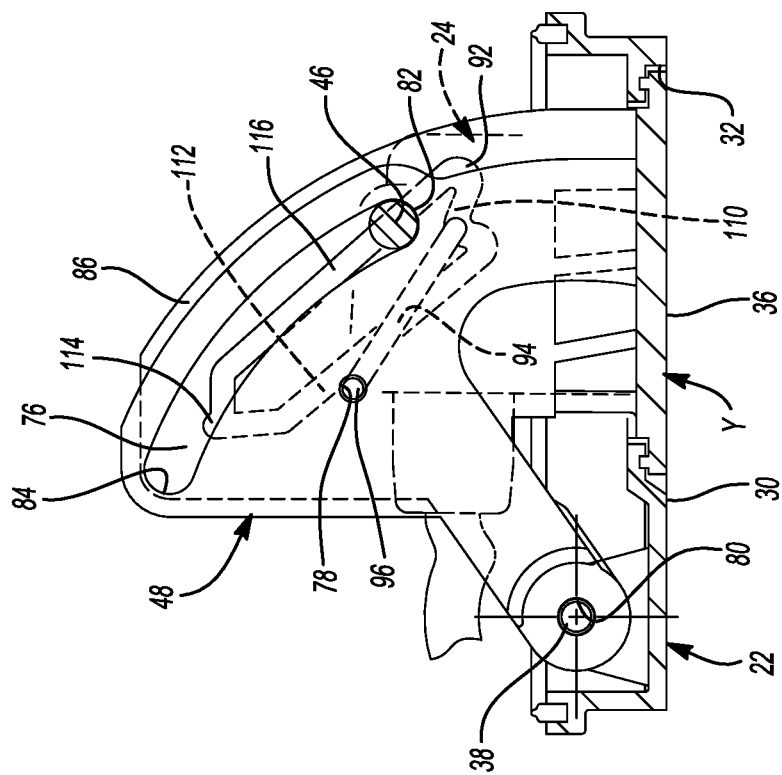
FIG. 11 is a partial cross-sectional view of the deployable sensor assembly of FIG. 3 shown in the stowed position.
Figure 15:
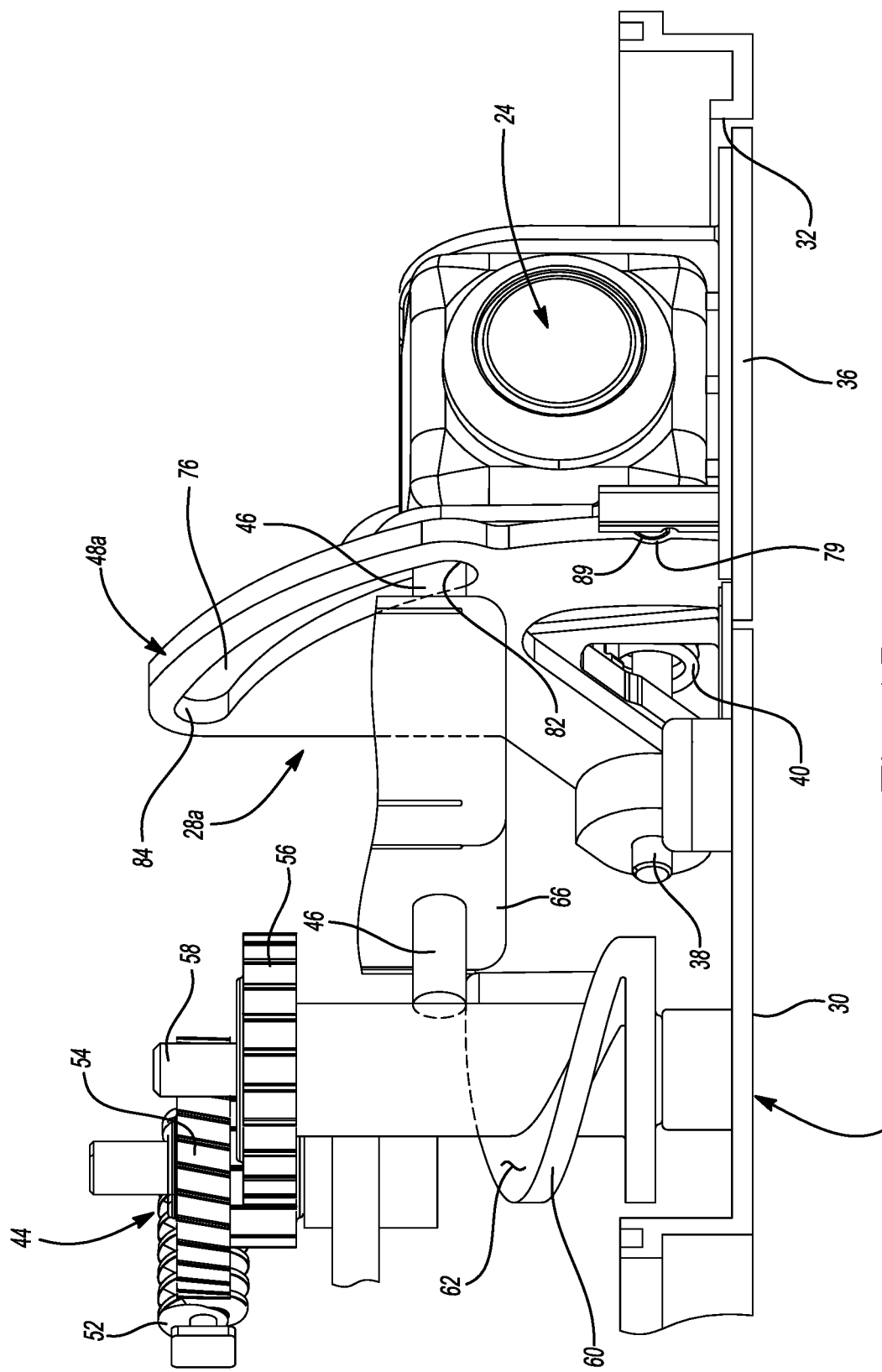
FIG. 15 is a partial perspective view of another deployable sensor assembly for use with the vehicle of FIGS. 1 and 2 shown in a stowed position.
Figure 16:
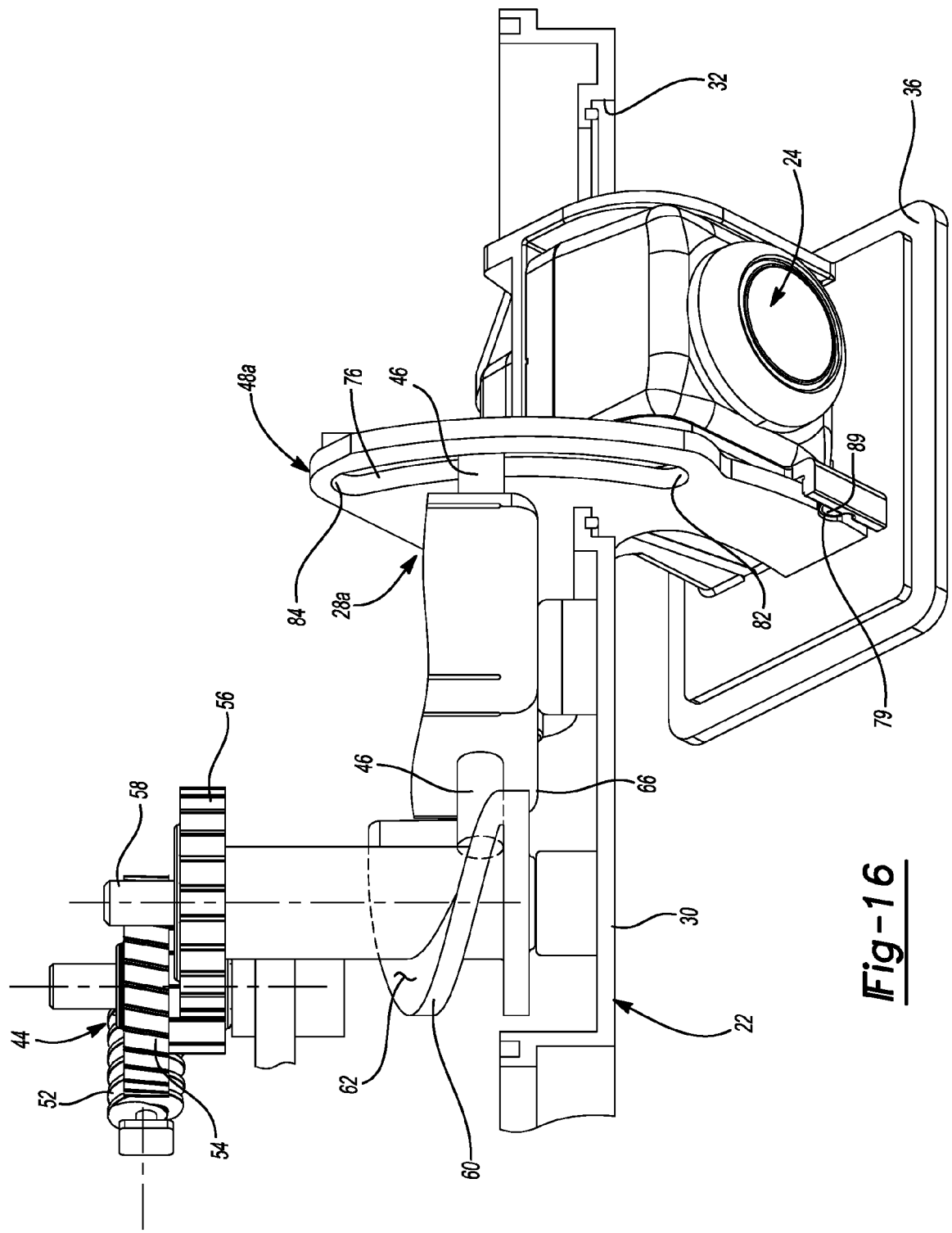
FIG. 16 is a partial perspective view of the deployable sensor assembly of FIG. 15 shown in the deployed position.
Figure 17:
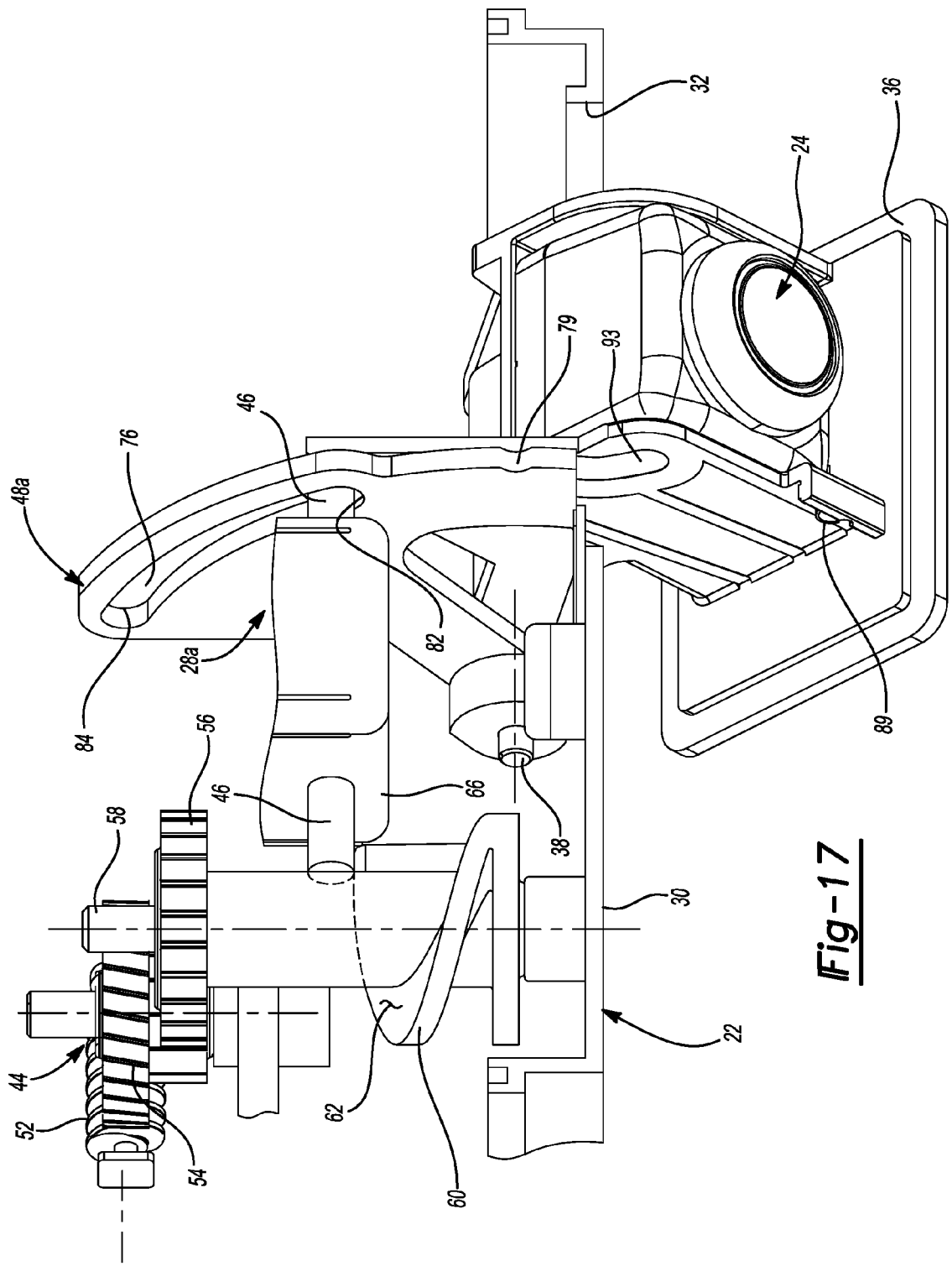
FIG. 17 is a partial perspective view of the deployable sensor assembly of FIG. 15 shown in the manually deployed position.
Figure 18:
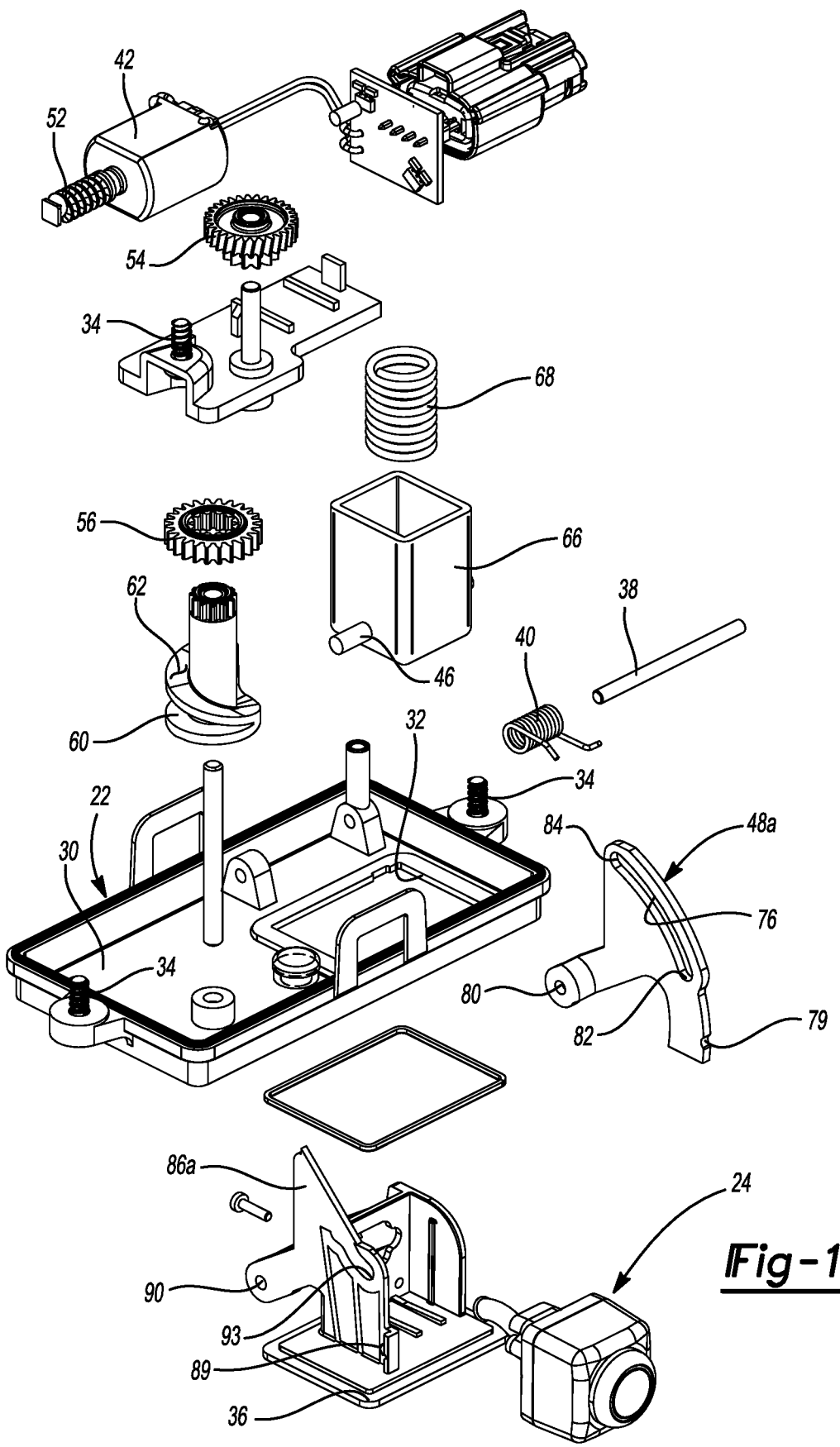
FIG. 18 is an exploded view of the deployable sensor assembly of FIG. 15.
Figure 19:
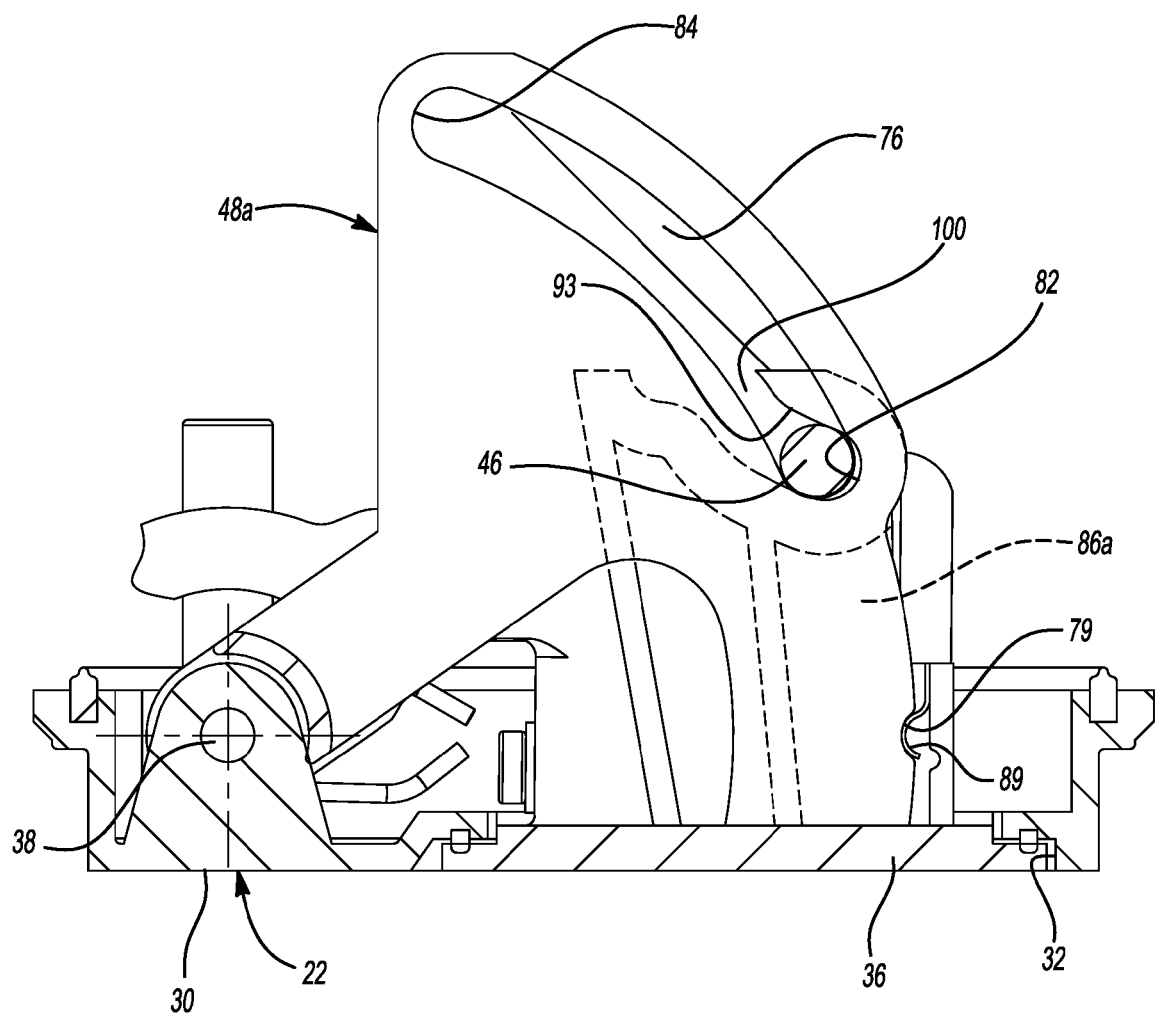
FIG. 19 is a partial cross-sectional view of the deployable sensor assembly of FIG. 18 shown in a stowed position.
Figure 20:
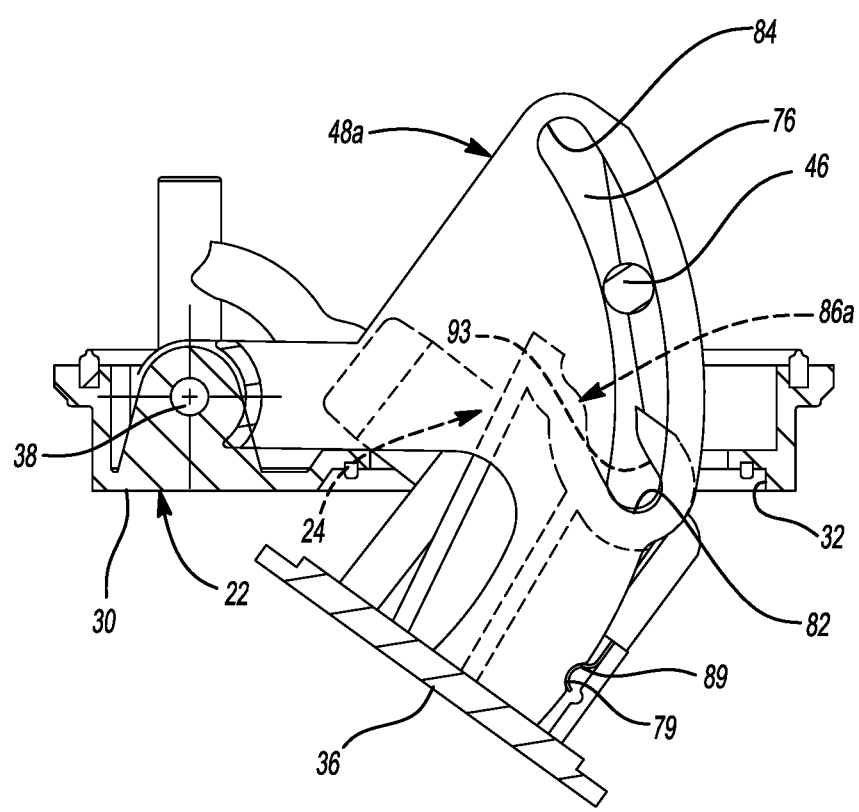
FIG. 20 is a partial cross-sectional view of the deployable sensor assembly of FIG. 18 shown in a deployed position.
Figure 21:
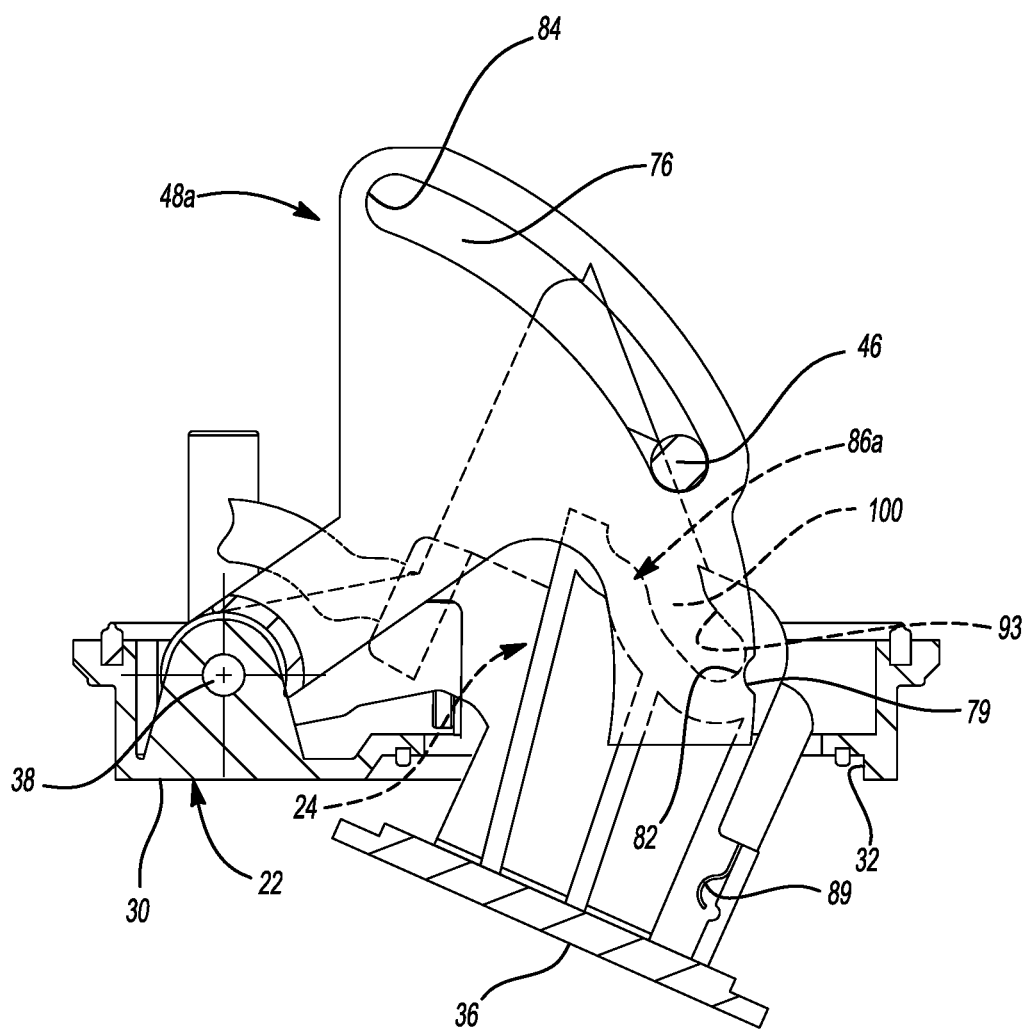
FIG. 21 is a partial cross-sectional view of the deployable sensor assembly of FIG. 18 shown in a manually deployed position.

The sensor 24, the door 36, and the guide plate 86 may be manually moved into the deployed position by applying a force of a predetermined magnitude to the door 36 proximate to an interface of the door 36 and the body 30 of the housing 22. For example, an upward force Y (i.e., in a direction toward the motor 42) may be applied to the door 36, as shown in FIG. 11. Such a force causes the door 36 and, thus, the sensor 24 and the guide plate 86 to rotate about the axle 38 in the counterclockwise (CCW) direction relative to the view shown in FIG. 11 and against the biasing force exerted on these components 24, 36, 86 by the biasing element 40. When the upward force is applied in the Y direction, the second end 98 of the pin 94 disengages the detent 110. Accordingly, when the upward force is released and the biasing element 40 is once again permitted to bias the sensor 24, the door 36, and the guide plate 86 in the clockwise (CW) direction relative to the view shown in FIG. 11, the second end 98 of the pin 94 is positioned such that the second end 98 opposes a first leg or inner cam surface 112 of the slot 92 and traverses the first leg 112 when the biasing element 40 rotates the guide plate 86 in the clockwise (CW) direction, as shown in FIG. 12. The second end 98 continues to traverse the first leg 112 until the sensor 24 and the door 36 are in the fully deployed position (FIG. 13). At this point, the second end 98 of the pin 94 is disposed within a top portion or transition 114 of the slot 92.

The guide plate 86, the door 36, and the sensor 24 may be returned to the stowed position in one of two ways. First, a manual force may be applied to the door 36 to move the door 36, the sensor 24, and the guide plate 86 toward the housing 22 (i.e., in the direction Y shown in FIG. 11). In so doing, the second end 98 of the pin 94 traverses a second leg or outer cam surface 116 of the slot 92, as shown in FIG. 14. Once the door 36, the sensor 24, and the guide plate 86 are sufficiently moved toward the housing 22, the force applied to the door 36 is released and the second end 98 of the pin 94 is once again disposed within the detent 110 of the slot 92, which provides a transition between the first leg 112 and the second leg 116. As described above, the second end 98 of the pin 94 is maintained within the detent 110 due to the force exerted on the guide plate 86 by the biasing element 40 and, as such, once again fixes the guide plate 86 for movement with the actuation member 48. Second, the motor 42 could be cycled such that the actuation member 48 is moved from the position shown in FIG. 3 to the position shown in FIG. 5 to cause the second end 98 of the pin 94 to traverse the second leg 116 of the slot 92 and once again be received within the detent 110. Namely, once the second end 98 of the pin 94 traverses the second leg 116 and opposes the detent 110, the motor 42 may be stopped to permit the biasing element 40 to maintain the second end 98 in engagement with the slot 92 at the detent 110, thereby fixing the guide plate 86 for rotation with the actuation member 48. As such, when the motor 42 is cycled again and the actuation pin 46 exerts a force on the slot 76 of the actuation member 48 to move the actuation member 48 back to the stowed position, the guide plate 86, the door 36, and the sensor 24 are likewise moved into the stowed position.

While the guide plate 86 is described and shown in as including a closed, continuous slot 92 that receives a pin 94, the sensor assembly 10 could alternatively include a guide plate having a different configuration, as described below.

Figure 22:
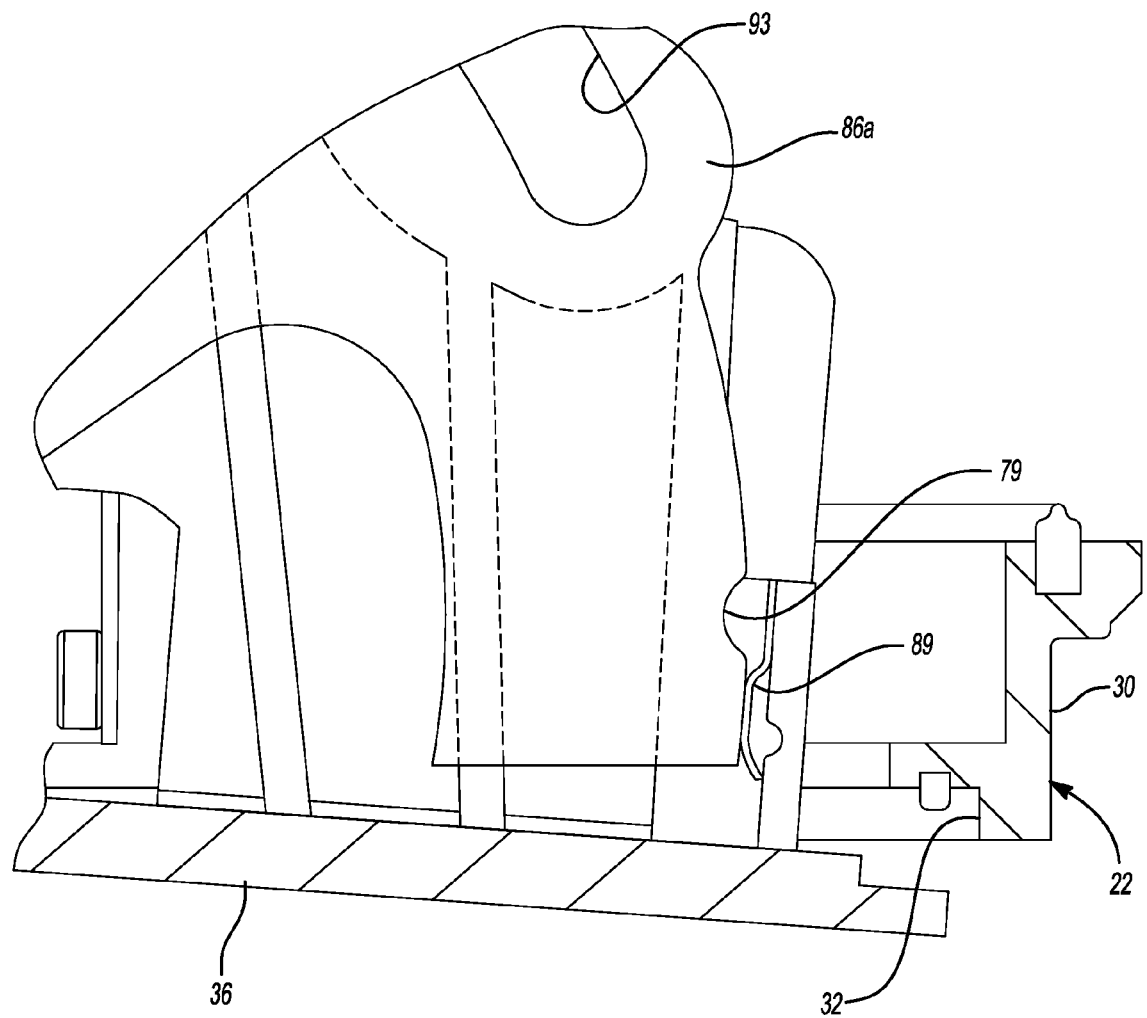
FIG. 22 is a partial cross-sectional view of the deployable sensor assembly of FIG. 18 showing movement of an attachment feature of a sensor door moving toward a retention feature of an actuation mechanism.

With reference to FIG. 22, a sensor assembly 10a is provided and includes a housing 22, a sensor 24, an actuation mechanism 26, and an attachment mechanism 28a. In view of the substantial similarity in structure and function of the components associated with the sensor assembly 10 with respect to the sensor assembly 10a, like reference numerals are used hereinafter and in the drawings to identify like components while like reference numerals containing letter extensions are used to identify those components that have been modified.

The attachment mechanism 28a may include a guide plate 86a having a slot 93. The slot 93 is an open slot having an opening 100 and receives the actuation pin 46 therein when the sensor 24 is in the stowed position.

With particular reference to FIGS. 19-22, operation of the deployable sensor assembly 10a will be described in detail. The sensor 24 may be deployed based on input from a user of the vehicle 12. Namely, when a user positions a gear-shift mechanism (not shown) of the vehicle 12 into reverse, a signal may be sent to energize the motor 42. When the motor 42 is energized, the output shaft 50 and, thus, the worm gear 52 are rotated. Rotation of the worm gear 52 likewise causes rotation of the first drive gear 54 and the second drive gear 56 relative to the housing 22.

Rotation of the second drive gear 56 causes rotation of the ramp 60 relative to the housing 22, which causes the actuation pin 46 to move along the cam surface 62 relative to the housing 22. In the stowed position, the actuation pin 46 is disposed proximate to the terminal end 64 of the cam surface 62, as shown in FIG. 3. In this position, the biasing element 68 is compressed and exerts a force on the actuation pin 46 in a direction toward the housing 22. When the motor 42 is energized and the ramp 60 rotates relative to the housing 22, the actuation pin 46 disengages the terminal end 64 of the ramp surface 62 and moves toward the housing 22.

The actuation pin 46 moves toward the housing 22 due to the force exerted on the flange 72 by the biasing element 68. In so doing, the actuation pin 46 exerts a force on the slot 76 at the first end 82, thereby causing the actuation member 48a to rotate relative to the housing 22 and causing the actuation pin 46 to traverse the slot 76 and move from the first end 82 toward the second end 84. Rotation of the actuation member 48a relative to the housing 22 likewise causes rotation of the guide plate 86a, the door 36, and the sensor 24 relative to the housing 22 due to interaction between the actuation pin 46 and the slot 93. Additionally, the guide plate 86a, the door 36, and the sensor 24 are moved into the deployed position under the rotational force exerted on the sensor 24 by the biasing element 40. Accordingly, the sensor 24 is moved from the stowed position (FIG. 3) to the deployed position (FIG. 5) and is permitted to sense an area around the vehicle 12 proximate to the opening 32 of the body 30.

The motor 42 may be driven in the same direction to return the sensor 24 to the stowed position by once again driving the gear train 44 relative to the housing 22. Namely, the motor 42 may rotate the ramp 60, thereby causing the actuation pin 46 to move along the ramp surface 62 toward the terminal end 64. In so doing, the actuation pin 46—via the flange 72—compresses the biasing element 68 and causes the actuation pin 46 to traverse the slot 76. Movement of the actuation pin 46 along the slot 76 causes the actuation member 48a to rotate relative to the housing 22. Rotation of the actuation member 48a likewise causes rotation of the guide plate 86a, the door 36, and the sensor 24 toward the stowed position due to interaction between a retention feature 79 of the actuation member 48a and an attachment feature 89 of the guide plate 86a. Once the actuation pin 46 is returned to the position shown in FIG. 3—proximate to the terminal end 64 of the ramp 60—power to the motor 42 is stopped and the sensor 24 is returned to the stowed position with the door 36 being substantially flush with the body 30 of the housing 22.

In one configuration, the attachment feature 89 may extend from the guide plate 86a toward the retention feature 79 of the actuation member 48a. The attachment feature 89 may be a spring that, when received by the retention feature 79, is compressed and fixes the attachment feature 89 to the retention feature 79. Namely, the attachment feature 89 may be a bent piece of metal acting as a spring that, when compressed by the retention feature 79, stores energy and springs back to conform to the shape of the retention feature 79. In so doing, the guide plate 86a, the door 36, and the sensor 24 are fixed for movement with the actuation member 48a due to interaction between the retention feature 79 and the attachment feature 89.

The foregoing describes normal operation of the sensor assembly 10. Should a user wish to access the sensor 24 independent from operation of the vehicle 12 to perform maintenance on or clean the sensor 24, the sensor 24, the door 36 and the guide plate 86a may be manually rotated relative to the housing 22 and into the deployed position independent of the actuation mechanism 26. Namely, the actuation mechanism 26 may remain in the stowed position with the actuation pin 46 disposed adjacent to the first end 82 of the slot 76 of the actuation member 48a and the sensor 24, the door 36, and the guide plate 86a may all be manually moved into the deployed position in an effort to access the sensor 24.

The sensor 24, the door 36, and the guide plate 86a may be manually moved into the deployed position by applying a force of a predetermined magnitude to the door 36 proximate to an interface of the door 36 and the body 30 of the housing 22. For example, a lever arm such as a flathead screwdriver or key (neither shown) may be inserted between the door 36 and the body 30 at a junction of the door 36 and the body 30. The lever arm may be used to exert a force on the door 36 in an effort to move the door 36 and, thus, the sensor 24 in a direction away from the housing 22 and into the deployed position.

Once the force exceeds a predetermined magnitude, the attachment feature 89 of the guide plate 86a disengages the retention feature 79 of the actuation member 48a, thereby permitting the guide plate 86a and thus, the sensor 24 and the door 36, to rotate relative to the actuation member 48a and the housing 22 and into the deployed position. Such movement is permitted by allowing the slot 93 to separate from the actuation pin 46 at the opening 100 of the slot 93.

The guide plate 86a, the door 36, and the sensor 24 may be returned to the stowed position in one of two ways. First, a manual force may be applied to the door 36 to move the door 36, the sensor 24, and the guide plate 86a toward the housing 22. Once the door 36, the sensor 24, and the guide plate 86a are sufficiently moved toward the housing 22, the attachment feature 89 is received by the retention feature 79 and once again fixes the guide plate 86a for movement with the actuation member 48a. Second, the motor 42 could be cycled such that the actuation member 48a is moved from the position shown in FIG. 3 to the position shown in FIG. 5 to cause the retention feature 79 to move toward and engage the attachment feature 89. Once the retention feature 79 engages the attachment feature 89, the guide plate 86a is once again fixed for rotation with the actuation member 48a. As such, when the motor 42 is cycled again and the actuation pin 46 exerts a force on the slot 76 of the actuation member 48a to move the actuation member 48a back to the stowed position, the guide plate 86a, the door 36, and the sensor 24 are likewise moved into the stowed position.

While the sensor assembly 10a is described as including an attachment feature 89 having spring-like characteristics to selectively fix the guide plate 86a for movement with the actuation member 48a via interaction with a retention feature 79 of the actuation member 48a, other configurations (FIGS. 23-28) could be used in place of the retention feature 79 and attachment feature 89.

With reference to FIGS. 23 and 24, a retention feature 79b and an attachment feature 89b are shown for use in conjunction with the sensor assembly 10a described above and respectively replace the retention feature 79 and attachment feature 89.

The retention feature 79b may be a recess formed into the actuation member 48a and may matingly receive the attachment feature 89b of the guide plate 86a. The attachment feature 89b may be supported by a post 102 extending from and fixed for movement with the door 36 and may include a projection 104. The attachment feature 89b may be formed from a resilient material that deflects or compresses when engaging the actuation member 48a and automatically expands into the retention feature 79b when the guide plate 86a is properly positioned relative to the actuation member 48a. When the attachment feature 89b is received within the retention feature 79b, the guide plate 86a is fixed for movement with the actuation member 48a. When the attachment feature 89b is disengaged from the retention feature 79b, the sensor 24, the door 36, and the guide plate 86a may be manually moved from the stowed position to the deployed position independent from the actuation mechanism 26. Movement of the attachment feature 89b from the retention feature 79b may be accomplished by applying a predetermined force to the door 36 to cause the projection 104 to be removed from the retention feature 79b by compressing the projection 104 between the post 102 and the actuation member 48a. Such compression is due to the resilient nature of the material forming the attachment feature 89b.

Figure 26:
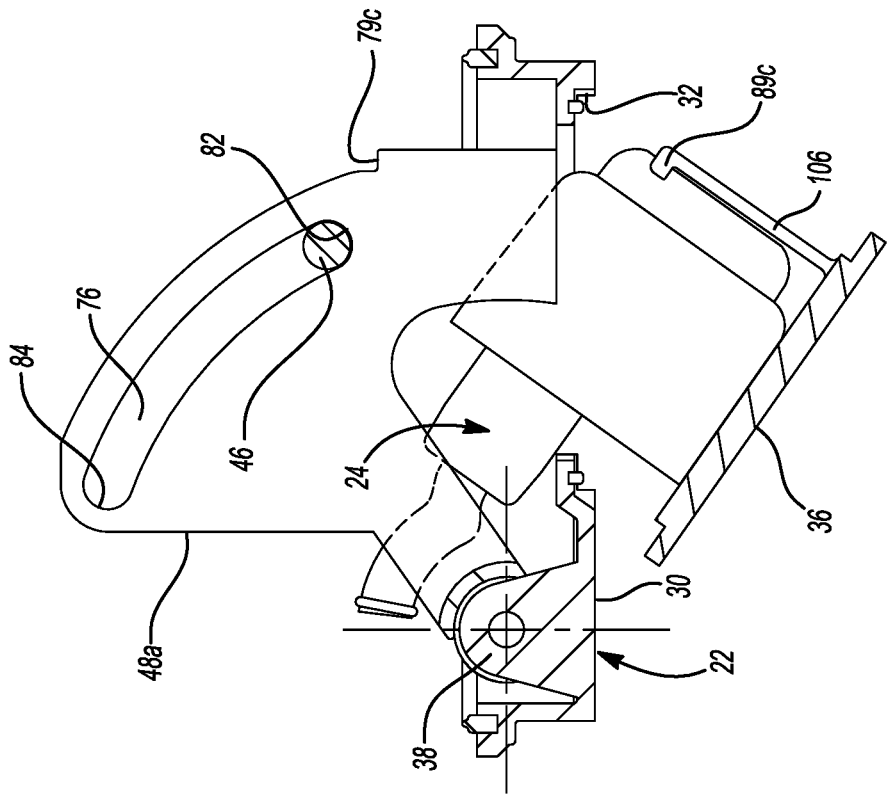
FIG. 26 is a partial cross-sectional view of the attachment mechanism of FIG. 25 shown in a manually deployed position.
Figure 25:
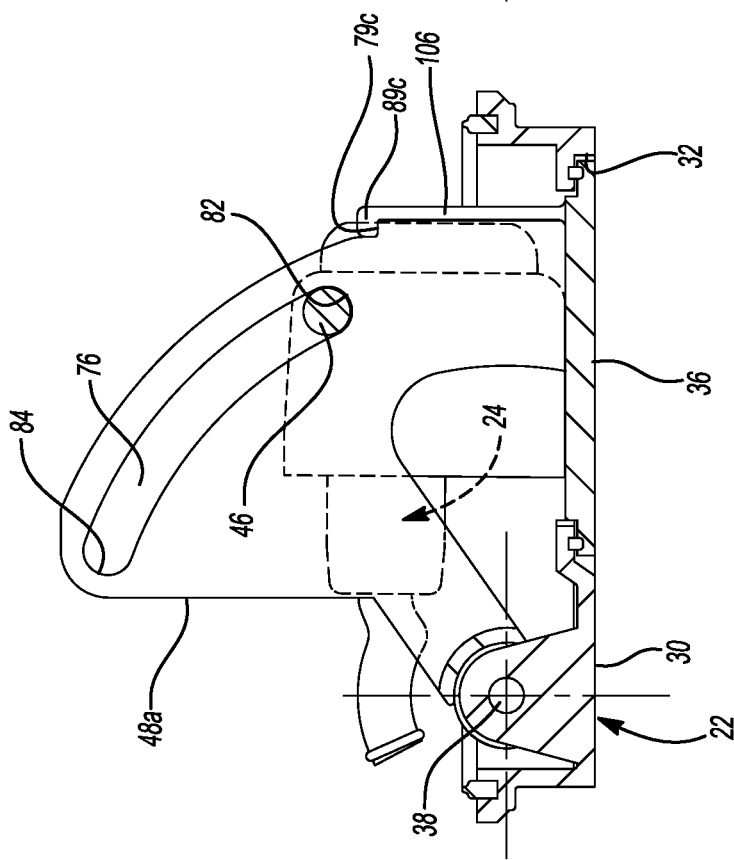
FIG. 25 is a partial cross-sectional view of an alternate attachment mechanism for use with the deployable sensor assembly of FIG. 3 or FIG. 15 shown in a stowed position.

With reference to FIGS. 25 and 26, a retention feature 79c and an attachment feature 89c are shown for use in conjunction with the sensor assembly 10a described above and respectively replace the retention feature 79 and attachment feature 89.

The retention feature 79c may be an engagement surface formed on the actuation member 48a and may receive the attachment feature 89c of the guide plate 86a. The attachment feature 89c may be supported by and integrally formed with a post 106 extending from and fixed for movement with the door 36. The attachment feature 89c may be formed from a resilient material that deflects when engaging the actuation member 48a and automatically engages the retention feature 79c when the guide plate 86a is properly positioned relative to the actuation member 48a. When the attachment feature 89c is received by the engagement surface of the retention feature 79c, the guide plate 86a is fixed for movement with the actuation member 48a. When the attachment feature 89c is disengaged from the retention feature 79c, the sensor 24, the door 36, and the guide plate 86a may be manually moved from the stowed position to the deployed position independent from the actuation mechanism 26. Movement of the attachment feature 89c from the retention feature 79c may be accomplished by applying a predetermined force to the door 36 to cause the attachment feature 89c to disengage the retention feature 79c.

Figure 27:
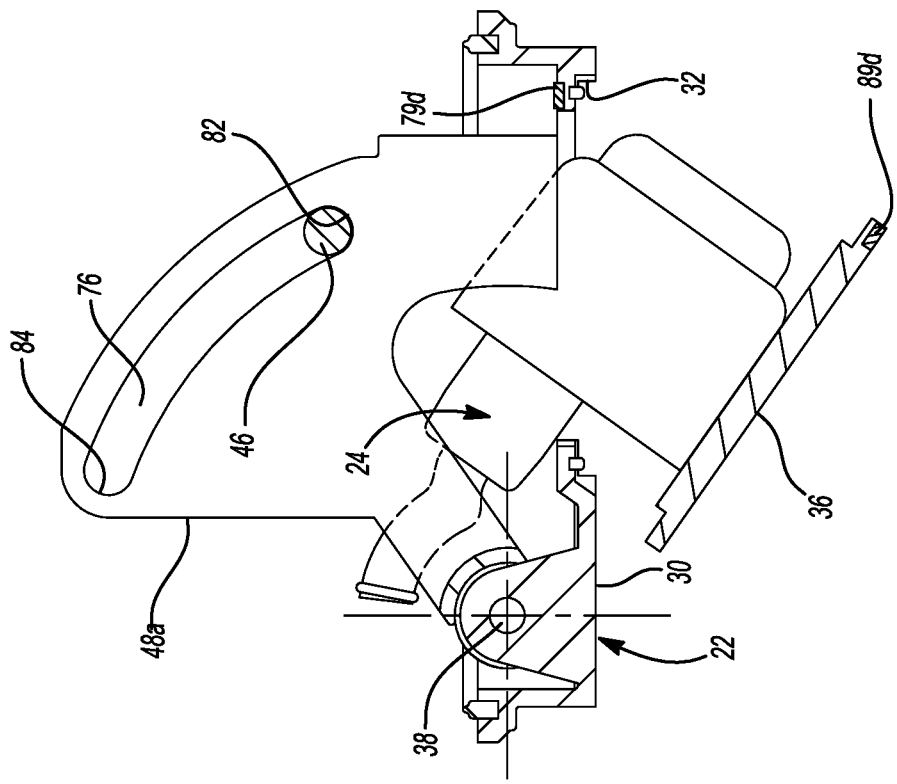
FIG. 27 is a partial cross-sectional view of an alternate attachment mechanism for use with the deployable sensor assembly of FIG. 3 or FIG. 15 shown in a stowed position.
Figure 28:
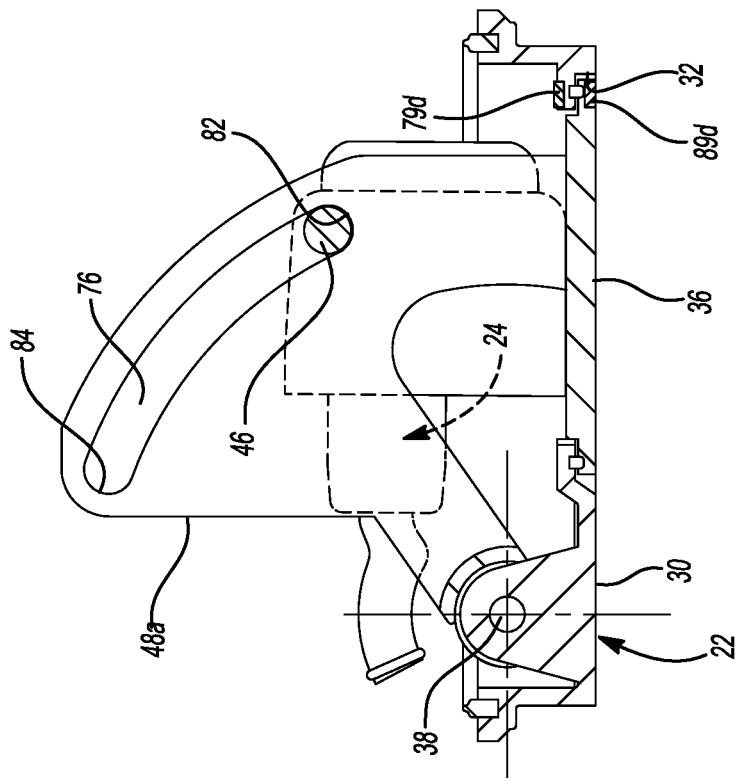
FIG. 28 is a partial cross-sectional view of the attachment mechanism of FIG. 27 shown in a manually deployed position.

With reference to FIGS. 27 and 28, a retention feature 79d and an attachment feature 89d are shown for use in conjunction with the sensor assembly 10a described above and respectively replace the retention feature 79 and attachment feature 89.

The retention feature 79d may include a first magnet attached to the actuation member 48a and the attachment feature 89d may include a second magnet attached to the guide plate 86a. When the second magnet of the attachment feature 89d is brought into close proximity with the first magnet of the retention feature 79d, the guide plate 86a is fixed for movement with the actuation member 48a due to interaction between the first magnet and the second magnet. When the attachment feature 89d is disengaged from the retention feature 79d, the sensor 24, the door 36, and the guide plate 86a may be manually moved from the stowed position to the deployed position independent from the actuation mechanism 26. Movement of the attachment feature 89d from the retention feature 79d may be accomplished by applying a predetermined force to the door 36 to cause the attachment feature 89d to disengage the retention feature 79d by overcoming the attractive forces of the first magnet and the second magnet.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A closure assembly comprising:
   a housing;
   a sensor disposed within the housing;
   a door supported by the housing, the door movable between a closed position and an open position, the sensor being exposed when the door is in the open position;
   an actuation mechanism operable between a first position and a second position, the actuation mechanism moving the door from the closed position to the open position when moved from the first position to the second position and moving the door from the open position to the closed position when moved from the second position to the first position; and
   an attachment mechanism operable in a first state to couple the door for movement with the actuation mechanism and in a second state to decouple the door from the actuation mechanism,
   wherein the attachment mechanism is automatically returned to the first state from the second state when the actuation mechanism is cycled from the first position to the second position.

2. The closure assembly of claim 1, wherein the attachment mechanism includes an energy retaining connection.

3. The closure assembly of claim 2, wherein the energy retaining connection is a deformable member.

4. The closure assembly of claim 2, wherein the energy retaining connection includes an energy storing element.

5. The closure assembly of claim 4, wherein the energy storing element includes at least one of a leaf spring and a coil spring.

6. The closure assembly of claim 1, wherein the attachment mechanism includes a magnet, the magnet having a first portion associated with the actuation mechanism and a second portion associated with the door.

7. The closure assembly of claim 1, wherein the attachment mechanism includes at least one cam surface and at least one cam follower.

8. The closure assembly of claim 7, wherein the at least one cam surface includes a detent operable to receive a pin associated with the actuation mechanism, the pin selectively received within the detent to fix the door for movement with the actuation mechanism.

9. The closure assembly of claim 7, wherein the at least one cam surface includes a first cam surface and a second cam surface.

10. The closure assembly of claim 9, further comprising at least one transition connecting the first cam surface and the second cam surface.

11. The closure assembly of claim 1, wherein the actuation mechanism is movable from the first state to the second state by applying a manual force on the door.

12. A closure assembly comprising:
    a housing;
    a sensor disposed within the housing;
    a door supported by the housing, the door movable between a closed position and an open position, the sensor being exposed when the door is in the open position; and
    an actuation mechanism operable between a first position and a second position, the actuation mechanism moving the door from the closed position to the open position when moved from the first position to the second position and moving the door from the open position to the closed position when moved from the second position to the first position, the actuation mechanism operable to be decoupled from the door when a manual force at or above a predetermined magnitude is applied to the door,
    wherein the door is movable from the closed position to the open position when the door is decoupled from the actuation mechanism regardless of the position of the actuation mechanism.

13. The closure assembly of claim 12, further comprising an attachment mechanism operable in a first state to couple the door for movement with the actuation mechanism and in a second state to decouple the door from the actuation mechanism.

14. The closure assembly of claim 13, wherein the attachment mechanism includes an energy retaining connection.

15. The closure assembly of claim 14, wherein the energy retaining connection is a deformable member.

16. The closure assembly of claim 14, wherein the energy retaining connection includes an energy storing element.

17. The closure assembly of claim 16, wherein the energy storing element includes at least one of a leaf spring and a coil spring.

18. The closure assembly of claim 13, wherein the attachment mechanism includes a magnet, the magnet having a first portion associated with the actuation mechanism and a second portion associated with the door.

19. The closure assembly of claim 13, wherein the actuation mechanism is movable from the first state to the second state by applying the manual force on the door.

20. The closure assembly of claim 13, wherein the attachment mechanism is automatically returned to the first state from the second state when the actuation mechanism is cycled from the first position to the second position.

21. A method of operating a closure assembly, the method comprising:
    moving a door between a closed position and an open position relative to a housing via an actuation mechanism, the actuation mechanism moving the door from the closed position to the open position when moved from a first position to a second position and moving the door from the open position to the closed position when moved from the second position to the first position;
    exposing a sensor disposed within the housing when the door is in the open position;
    applying a manual force at or above a predetermined magnitude to the door to decouple the door from the actuation mechanism; and
    permitting the door to be movable from the closed position to the open position regardless of the position of the actuation mechanism when the door is decoupled from the actuation mechanism.

22. The method of claim 21, further comprising coupling the door to the actuation mechanism via an attachment mechanism to cause the door to move with the actuation mechanism between the first position and the second position.

23. The method of claim 22, wherein applying the manual force at or above a predetermined magnitude includes decoupling the attachment mechanism from the actuation mechanism.

24. The method of claim 22, wherein coupling the door to the actuation mechanism via an attachment mechanism includes coupling the door via at least one of a leaf spring, a coil spring, and a magnet.

25. A closure assembly comprising:
    a housing;
    a sensor disposed within the housing;

a door supported by the housing, the door movable between a closed position and an open position, the sensor being exposed when the door is in the open position;

an actuation mechanism operable between a first position and a second position, the actuation mechanism moving the door from the closed position to the open position when moved from the first position to the second position and moving the door from the open position to the closed position when moved from the second position to the first position, the actuation mechanism operable to be decoupled from the door when a manual force at or above a predetermined magnitude is applied to the door; and an attachment mechanism operable in a first state to couple the door for movement with the actuation mechanism and in a second state to decouple the door from the actuation mechanism, wherein the attachment mechanism is automatically returned to the first state from the second state when the actuation mechanism is cycled from the first position to the second position.

\* \* \* \* \*